(12) United States Patent
Hawkins

(10) Patent No.: US 7,464,859 B1
(45) Date of Patent: Dec. 16, 2008

(54) REIMBURSEMENT PROCESS AND PROCESSOR FOR CONDUCTING A FINANCIAL TRANSACTION

(76) Inventor: Fred Hawkins, 29 Aldwyn La., Villanova, PA (US) 19085

( * ) Notice: Subject to any disclaimer, the term of this patent is extended or adjusted under 35 U.S.C. 154(b) by 266 days.

(21) Appl. No.: 11/304,591

(22) Filed: Dec. 16, 2005

Related U.S. Application Data

(60) Provisional application No. 60/636,632, filed on Dec. 17, 2004.

(51) Int. Cl.
*G07F 19/00* (2006.01)
(52) U.S. Cl. .................. 235/379; 235/380; 235/382; 705/35
(58) Field of Classification Search .............. 235/379, 235/375, 380, 382; 705/35, 39
See application file for complete search history.

(56) References Cited

U.S. PATENT DOCUMENTS

| | | | | |
|---|---|---|---|---|
| 7,174,302 B2 * | 2/2007 | Patricelli et al. | ............... | 705/4 |
| 7,380,707 B1 * | 6/2008 | Fredman | ..................... | 235/379 |
| 2002/0116329 A1 * | 8/2002 | Serbetcioglu et al. | ......... | 705/39 |
| 2004/0143741 A1 * | 7/2004 | Edwards | ..................... | 713/176 |
| 2005/0121511 A1 * | 6/2005 | Robbins et al. | ............. | 235/380 |
| 2006/0113376 A1 * | 6/2006 | Reed et al. | .................. | 235/379 |

* cited by examiner

*Primary Examiner*—Seung H Lee

(57) ABSTRACT

A purchase account is issued without association to a reimbursement account. The purchase account is registered, forming an association with the reimbursement account for reimbursement transactions. At least one purchase transaction is conducted by a user using the registered purchase account, including reimbursable and/or unallowable purchases. An obligation is created upon the user of the registered purchase account to pay for the at least one purchase transaction with funds associated with the user from an account other than the reimbursement account. Purchase transaction data associated with the at least one purchase transaction is collected and forwarded to a reimbursement processor. Purchases that are reimbursable from the purchase transaction data are identified using the reimbursement processor. Authorization for reimbursement is implemented when there are identified reimbursable purchases. The identified reimbursable purchases are associated with the reimbursement account based upon the association created between the registered purchase account and the reimbursement account.

44 Claims, 9 Drawing Sheets

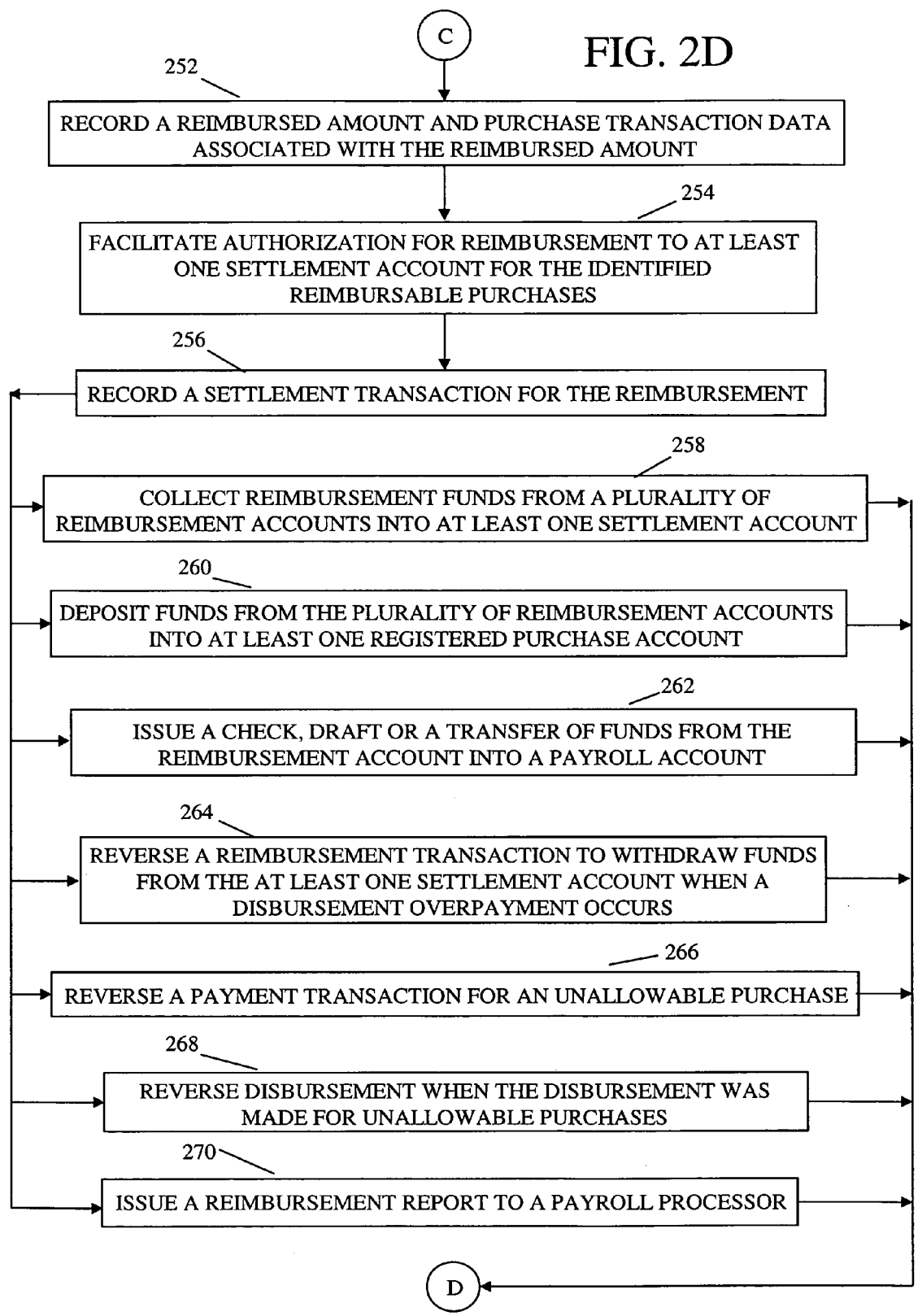

REIMBURSEMENT PROCESS AND PROCESSOR FOR CONDUCTING A FINANCIAL TRANSACTION

BACKGROUND

1. Field of the Invention

The present invention relates to financial transaction systems. More particularly, the present invention relates to a reimbursement process and processor for conducting financial transactions.

2. Background Information

Currently most holders of pretax flexible savings accounts (FSAs), such as, for example, health reimbursement arrangements (HRAs), health savings accounts (HSAs), medical spending accounts (MSAs) or other FSAs (collectively, "restricted use flex accounts"), use the restricted funds for health, dental, vision and pharmacy insurance co-payments and deductibles. New regulations enable the purchase of Over-the-Counter (OTC) medications, which are available at many vendors without sufficient automated means for presenting transaction data to account administrators charged with substantiating such restricted use flex accounts. Additionally, banks are aggressively issuing restricted use flex account debit cards without an ability to adequately automate administration of purchase restrictions at the line item level. Thus, cardholders are required to make decisions relating to allowable purchases at the point and time of sale. Additionally, cardholders must separate their purchases into multiple distinct groups of items and multiple payment tenders (restricted use debit card and cash or other general purpose payment method) for allowable (i.e., reimbursable) and unallowable (non-reimbursable) items, costing the cardholder both time and convenience. In addition, the cardholder may mistakenly or unknowingly group an unallowable item(s) with allowable ones, thus inadvertently using restricted funds for an unallowable purchase(s).

Rebate or promotional account systems are also known. In the rebate/promotional account based system, a user first registers a credit or debit card with a third party promotional account system provider (the "third party provider"). When the user makes a purchase of a promotional or special item from merchants/vendors that participate in the rebate/promotional account system, a certain percentage of that purchase will be transferred (the percentage amount or rebate) from the merchant/vendor to the third party provider. The third party provider deposits the percentage amount into a special account that is associated with the user. The value of the percentage amount is governed by agreements between the merchants/vendors and the third party provider (typically, in the order of 1-3%). Only the purchase of promotional or special items that are being pushed by the merchant/vendor or manufacturer will trigger the transfer of the percentage amount from the merchant/vendor to the third party provider. From time-to-time, the merchant/vendor or manufacturer and/or the third party provider can advertise that the purchase of certain really special items will trigger an additional amount or rebate to be transferred to the special account associated with the user. The special account is not administered by the third party provider; it typically is a user's credit or debit card account, a qualified education savings account or a registered non-profit organization. Qualified education savings accounts can be a "529" education savings account.

The essence of the rebate/promotional account based system is that it is not the user's funds (or the user's employer's funds) that are transferred to the special account, but the merchant/vendor's or manufacturer's funds. The rebate/promotional account based system is well known to those of ordinary skill in the art. An example of such a rebate/promotional account based system is UPromise®. This type of rebate/promotional account based system is not part of the embodiments of the present invention and is, therefore, excluded therefrom. Stated another way, allowable purchases in the context of restricted use flex accounts should not be equated with purchases made under the rebate/promotional account based or like systems described above.

Therefore, there is a need for a system and method for automatically collecting data that can be used to substantiate transactions associated with restricted use flex accounts and to facilitate reimbursements for such accounts.

SUMMARY OF THE INVENTION

A reimbursement process and a reimbursement processor are disclosed for conducting a financial transaction. In accordance with exemplary embodiments of the present invention, according to a first aspect of the present invention, a method of conducting a financial transaction includes the steps of: issuing a purchase account with an absence of association to a reimbursement account; registering the purchase account, wherein an association with the reimbursement account is formed for reimbursement transactions; conducting at least one purchase transaction by a user using the registered purchase account, wherein the at least one purchase transaction comprises at least one of reimbursable and unallowable purchases, wherein the at least one purchase transaction creates an obligation upon the user of the registered purchase account to pay for the at least one purchase transaction with funds associated with the user, and wherein purchase transaction data associated with the at least one purchase transaction is collected; forwarding the purchase transaction data to a reimbursement processor; identifying purchases that are reimbursable from the purchase transaction data, using the reimbursement processor; and implementing authorization for reimbursement when there are identified reimbursable purchases, wherein the identified reimbursable purchases are associated with the reimbursement account based upon the association created between the registered purchase account and the reimbursement account.

According to the first aspect, the step of conducting can be performed by the user at a registered vendor. The method can include the step of: settling payment with the registered vendor for the at least one purchase transaction using an account other than the reimbursement account. The step of implementing authorization can comprise the step of: facilitating authorization for reimbursement to at least one settlement account for the identified reimbursable purchases. The method can include the step of: registering the reimbursement account, at least one settlement account and at least one registered purchase account for a user. The step of registering can be performed either electronically or manually. The method can include the steps of: registering at least one registered purchase account for a third party associated with the user; and/or re-affirming an agreement with the user, each time the registered purchase account is used, that reimbursable purchases made in connection with the registered purchase account will only be used for authorized purposes. The registered purchase account can comprise, for example, a registered card. The method can include the step of: affixing a decal or the like to the registered card that enables compliance with regulations relating to purchases that initiate disbursements from the reimbursement account. The registered card can comprise, for example, a bar code, a magnetic stripe, a chip or the like.

According to the first aspect, the purchase transaction data can be forwarded in a secure format. Information associated with the registered purchase account can be encrypted. The method can include the step of: encrypting the purchase transaction data using a hashing function associated with the registered purchase account. The step of forwarding can be performed substantially concurrently when the at least one purchase transaction is conducted. The purchase transaction data associated with the at least one purchase transaction can comprise a SKU, a UPC, a CPT, a quantity of items or services purchased, prices of the items or services purchased, taxes, delivery charges, and/or freight charges. The method can include the steps of: storing the purchase transaction data associated with the at least one purchase transaction; and aggregating purchase transaction data associated with a plurality of purchase transactions from a plurality of registered purchase accounts associated with the user. The method can include the step of: applying business logic to identify purchases of the at least one purchase transaction that are reimbursable. Each of a plurality of reimbursement accounts can be associated with one of a plurality of rule sets. The step of applying business logic can be applied to each of the plurality of rule sets for each of the plurality of reimbursement accounts. The step of applying business logic can comprise the step of: determining applicability of reimbursement of reimbursable purchases from unallowable purchases.

According to the first aspect, the step of implementing authorization can comprise the step of: confirming, denying or delaying authorization of reimbursement. The method can include the steps of: requesting additional information from the user to implement authorization for reimbursement; receiving authorization of reimbursement from a third-party entity; forwarding reimbursable purchase data to a third-party entity; storing an amount for reimbursement; aggregating a total amount of reimbursement from a plurality of purchase transactions; aggregating a total amount of reimbursement on purchase transactions from a plurality of registered purchase accounts associated with the user; and/or classifying purchase transactions from each of the plurality of registered purchase accounts associated with the user. Each classification can comprise a user transaction classification or a tentative user transaction classification. The method can include the steps of: recording a reimbursed amount and purchase transaction data associated with the reimbursed amount; and/or recording a settlement transaction for the reimbursement. The settlement transaction can comprise complete reimbursements, pending reimbursements and/or partial reimbursements.

According to the first aspect, a reimbursement can be performed through a funds transfer from the reimbursement account to the user. Alternatively, a reimbursement can be performed through a funds transfer from the reimbursement account into at least one settlement account. Alternatively, a reimbursement can be performed through a net settlement process. Additionally, a reimbursement can be performed by decrementing a value of the reimbursement account and incrementing a value of a settlement account. The reimbursement account can comprise a healthcare spending account, a dependent care account, a flexible spending account and/or a transit account. Alternatively, the reimbursement account can comprise a corporate expense account, a client expense account, and/or an employer's expense account. The funds transfer can comprise an automated clearing house transfer. Alternatively, the funds transfer can comprise a transfer of funds between accounts in different financial institutions. Alternatively, the funds transfer can comprise a transfer of funds between accounts within a financial institution.

According to the first aspect, the method can include the steps of: issuing a reimbursement report to a payroll processor; reversing a reimbursement transaction by withdrawing funds from the at least one settlement account, when a disbursement overpayment occurs; collecting reimbursement funds from a plurality of reimbursement accounts into at least one settlement account; depositing funds from the plurality of reimbursement accounts into at least one registered purchase account; issuing a check, draft or a transfer of funds from the reimbursement account into a payroll account; and/or providing reimbursement information to at least the user. The reimbursement information can include allowed purchases, unallowed purchases, reimbursements, reimbursable amounts, requests, and/or information associated with the user. The method can include the steps of: reversing a payment transaction for an unallowable purchase; reversing a disbursement when the disbursement was made for unallowable purchases; and/or reporting information associated with disbursement for unallowable purchases. The registered purchase account can comprise a credit card, a credit account, a debit card, a debit account, a customer loyalty card, a customer loyalty account or a vendor billing account. The method can include the step of: identifying the credit card, the credit account, the debit card, the debit account, the customer loyalty card, the customer loyalty account or the vendor billing account as the registered purchase account.

According to a second aspect of the present invention, a method of conducting a financial transaction includes the steps of: receiving purchase transaction data associated with at least one purchase transaction conducted by a user using a registered purchase account, wherein the registered purchase account is issued with an absence of association to a reimbursement account, wherein the at least one purchase transaction comprises at least one of reimbursable and unallowable purchases, wherein the at least one purchase transaction creates an obligation upon the user of the registered purchase account to pay for the at least one purchase transaction with funds associated with the user, wherein purchase transaction data associated with the at least one purchase transaction is collected, and wherein, subsequent to the issuance of the registered purchase account, an association is created between the registered purchase account and the reimbursement account for reimbursement transactions; identifying purchases that are reimbursable from the purchase transaction data; and implementing authorization for reimbursement when there are identified reimbursable purchases, wherein the identified reimbursable purchases are associated with the reimbursement account based upon the association between the registered purchase account and the reimbursement account.

According to the second aspect, the at least one purchase transaction can be conducted by the user at a registered vendor. The method can include the step of: settling payment with the registered vendor for the at least one purchase transaction using an account other than the reimbursement account. The step of implementing authorization can comprise the step of: facilitating authorization for reimbursement to at least one settlement account for the identified reimbursable purchases. The method can include the step of: registering the reimbursement account, at least one settlement account and at least one registered purchase account for a user. The step of registering can be performed electronically or manually. The method can include the steps of: registering at least one registered purchase account for a third party associated with the user; and/or re-affirming an agreement with the user, each time the registered purchase account is used, that reimbursable purchases made in connection with the registered purchase account will only be used for authorized purposes. The registered purchase account can comprise, for example, a registered card. The method can include the step of: affixing a decal or the like to the registered card that enables compliance with regulations relating to purchases that initiate disbursements from the reimbursement account. The registered card can comprise, for example, a bar code, a magnetic stripe, a chip or the like.

According to the second aspect, the purchase transaction data can be received in a secure format. Information associated with the registered purchase account can be encrypted. The method can include the step of: encrypting the purchase transaction data using a hashing function associated with the registered purchase account. The step of receiving can be performed substantially concurrently when the at least one purchase transaction is conducted. The purchase transaction data associated with the at least one purchase transaction can comprise a SKU, a UPC, and a CPT, a quantity of items or services purchased, prices of the items or services purchased, taxes, delivery charges, and/or freight charges. The method can comprise the steps of: storing the purchase transaction data associated with the at least one purchase transaction; and aggregating purchase transaction data associated with a plurality of purchase transactions from a plurality of registered purchase accounts associated with the user. The step of identifying can comprise the step of: applying business logic to identify purchases of the at least one purchase transaction that are reimbursable. Each of a plurality of reimbursement accounts can be associated with one of a plurality of rule sets. The step of applying business logic can be applied to each of the plurality of rule sets for each of the plurality of reimbursement accounts. The step of applying business logic can comprise the step of: determining applicability of reimbursement of reimbursable purchases from unallowable purchases.

According to the second aspect, the step of implementing authorization can comprise the step of: confirming, denying or delaying authorization of reimbursement. The method can include the steps of: requesting additional information from the user to implement authorization for reimbursement; receiving authorization of reimbursement from a third-party entity; forwarding reimbursable purchase data to a third-party entity; storing an amount for reimbursement; aggregating a total amount of reimbursement from a plurality of purchase transactions; aggregating a total amount of reimbursement on purchase transactions from a plurality of registered purchase accounts associated with the user; and/or classifying purchase transactions from each of the plurality of registered purchase accounts associated with the user. Each classification can comprise a user transaction classification or a tentative user transaction classification. The method can comprise the steps of: recording a reimbursed amount and purchase transaction data associated with the reimbursed amount; and/or recording a settlement transaction for the reimbursement. The settlement transaction can comprise complete reimbursements, pending reimbursements and/or partial reimbursements.

According to the second aspect, a reimbursement can be performed through a funds transfer from the reimbursement account to the user. Alternatively, a reimbursement can be performed through a funds transfer from the reimbursement account into at least one settlement account. Alternatively, a reimbursement can be performed through a net settlement process. Additionally, a reimbursement can be performed by decrementing a value of the reimbursement account and incrementing a value of a settlement account. The reimbursement account can comprise a healthcare spending account, a dependent care account, a flexible spending account and/or a transit account. Alternatively, the reimbursement account can comprise a corporate expense account, a client expense account, and/or an employer's expense account. The funds transfer can comprise an automated clearing house transfer. Alternatively, the funds transfer can comprise a transfer of funds between accounts in different financial institutions. Alternatively, the funds transfer can comprise a transfer of funds between accounts within a financial institution.

According to the second aspect, the method can comprise the steps of: issuing a reimbursement report to a payroll processor; reversing a reimbursement transaction by withdrawing funds from the at least one settlement account, when a disbursement overpayment occurs; collecting reimbursement funds from a plurality of reimbursement accounts into at least one settlement account; depositing funds from the plurality of reimbursement accounts into at least one registered purchase account; issuing a check, draft or a transfer of funds from the reimbursement account into a payroll account; and/or providing reimbursement information to at least the user. The reimbursement information can include allowed purchases, unallowed purchases, reimbursements, reimbursable amounts, requests, and/or information associated with the user. The method can include the steps of: reversing a payment transaction for an unallowable purchase; reversing a disbursement when the disbursement was made for unallowable purchases; and/or reporting information associated with disbursement for unallowable purchases. The registered purchase account can comprise a credit card, a credit account, a debit card, a debit account, a customer loyalty card, a customer loyalty account, or a vendor billing account. The method can include the step of: identifying the credit card, the credit account, the debit card, the debit account, the customer loyalty card, the customer loyalty account or the vendor billing account as the registered purchase account.

According to a third aspect of the present invention, a method of conducting a financial transaction includes the steps of: collecting purchase transaction data associated with a user, wherein the purchase transaction data is associated with at least one purchase transaction conducted by the user using a registered purchase account, wherein the registered purchase account is issued with an absence of association to a reimbursement account, wherein the at least one purchase transaction comprises at least one of reimbursable and unallowable purchases, and wherein the at least one purchase transaction creates an obligation upon the user of the registered purchase account to pay for the at least one purchase transaction with funds associated with the user; and providing the collected purchase transaction data for analysis, wherein, subsequent to the issuance of the registered purchase account, an association is created between the registered purchase account and the reimbursement account for reimbursement transactions, wherein purchases from the purchase transaction data are analyzed to determine reimbursable purchases and unallowable purchases, wherein authorization for reimbursement is initiated when there are reimbursable purchases, and wherein the reimbursable purchases are associated with the reimbursement account based upon the association between the registered purchase account and the reimbursement account.

According to the third aspect, the method can include the step of: providing incentives to the user based on the analysis of the collected purchase transaction data. The registered purchase account can comprise, for example, a merchant loyalty account. The collected purchase transaction data can be provided to a third-party entity. The third-party entity can forward the collected purchase transaction data to a reimbursement processor for analysis. The third-party entity can comprise, for example, a bank. The registered purchase account can comprise, for example, a credit card.

According to a fourth aspect of the present invention, a method of conducting a financial transaction includes the steps of: providing a registered purchase account to a user by a third-party entity, wherein the registered purchase account is issued with an absence of association to a reimbursement account, wherein the user uses the registered purchase account to conduct purchase transactions, wherein the purchase transactions comprise at least one of reimbursable and unallowable purchases, and wherein the purchase transactions create an obligation upon the user of the registered purchase account to pay for the purchase transactions with funds associated with the user; collecting purchase transaction data associated with the purchase transactions on behalf of the third-party entity; analyzing purchase transactions from the purchase transaction data to determine reimbursable purchases and unallowable purchases, wherein, subsequent to the issuance of the registered purchase account, an association is created between the registered purchase account and the reimbursement account for reimbursement transactions, wherein authorization for reimbursement is initiated when there are reimbursable purchases, and wherein the reimbursable purchases are associated with the reimbursement account based upon the association between the registered purchase account and the reimbursement account; and forwarding information associated with the analyzed purchase transaction data to the third-party entity. According to the fourth aspect, the third-party entity can comprise, for example, an employer of the user.

According to a fifth aspect of the present invention, a method of conducting a financial transaction includes the steps of: obtaining a registered purchase account by a user, wherein the registered purchase account is issued with an absence of association to a reimbursement account; conducting purchase transactions using the registered purchase account, wherein the purchase transactions comprise at least one of reimbursable and unallowable purchases, wherein the purchase transactions create an obligation upon the user of the registered purchase account to pay for the purchase transactions with funds associated with the user, wherein purchase transaction data associated with the purchase transactions conducted by the user is collected, wherein, subsequent to the issuance of the registered purchase account, an association is created between the registered purchase account and the reimbursement account for reimbursement transactions, wherein purchase transactions from the collected purchase transaction data are analyzed to determine reimbursable purchases and unallowable purchases, wherein authorization for reimbursement is initiated when there are reimbursable purchases, and wherein the reimbursable purchases are associated with the reimbursement account based upon the association between the registered purchase account and the reimbursement account.

According to a sixth aspect of the present invention, a system for conducting a financial transaction includes a purchase transaction data collector. A registered purchase account is issued with an absence of association to a reimbursement account. At least one purchase transaction is conducted by a user using the registered purchase account. The at least one purchase transaction comprises at least one of reimbursable and unallowable purchases. The at least one purchase transaction creates an obligation upon the user of the registered purchase account to pay for the at least one purchase transaction with funds associated with the user. The purchase transaction data collector is configured to collect purchase transaction data associated with the at least one purchase transaction. Subsequent to the issuance of the registered purchase account, an association is created between the registered purchase account and the reimbursement account for reimbursement transactions. The system includes a reimbursement processor in communication with the purchase transaction data collector. The reimbursement processor is configured to receive the purchase transaction data from the purchase transaction data collector. The reimbursement processor is configured to identify purchases that are reimbursable from the purchase transaction data. The reimbursement processor is configured to implement authorization for reimbursement when there are identified reimbursable purchases. The identified reimbursable purchases are associated with the reimbursement account based upon the association between the registered purchase account and the reimbursement account.

According to the sixth aspect, the at least one purchase transaction can be conducted by the user at a registered vendor. Payment can be settled with the registered vendor for the at least one purchase transaction using an account other than the reimbursement account. The reimbursement processor can be configured to facilitate reimbursement to at least one settlement account for the identified reimbursable purchases. The reimbursement account, at least one settlement account and at least one registered purchase account can be registered associated with the user. The registration can be performed electronically or manually. At least one registered purchase account for a third party associated with the user can be registered. A re-affirmation of an agreement with the user, that reimbursable purchases made in connection with the registered purchase account will only be used for authorized purposes, can be performed each time the registered purchase account is used. The registered purchase account can comprise, for example, a registered card. A decal or the like can be affixed to the registered card that enables compliance with regulations relating to purchases that initiate disbursements from the reimbursement account. The registered card can comprise a bar code, a magnetic stripe, a chip or the like.

According to the sixth aspect, the purchase transaction data can be received in a secure format. Information associated with the registered purchase account can be encrypted. The purchase transaction data can be encrypted using a hashing function associated with the registered purchase account. The purchase transaction data can be received substantially concurrently by the reimbursement processor from the purchase transaction data collector when the at least one purchase transaction is conducted. The purchase transaction data associated with the at least one purchase transaction can comprise a SKU, a UPC, and a CPT, a quantity of items or services purchased, prices of the items or services purchased, taxes, delivery charges, and/or freight charges. The system can include a data storage device in communication with the reimbursement processor. The reimbursement processor can be configured to store the purchase transaction data associated with the at least one purchase transaction using the data storage device. The reimbursement processor can be configured to aggregate purchase transaction data associated with a plurality of purchases from a plurality of registered purchase accounts associated with the user.

According to the sixth aspect, the reimbursement processor can be configured to apply business logic to identify purchases of the at least one purchase transaction that are reimbursable. Each of a plurality of reimbursement accounts can be associated with one of a plurality of rule sets. The reimbursement processor can be configured to apply each of the plurality of rule sets for each of the plurality of reimbursement accounts. The business logic can be applied to determine applicability of reimbursement of reimbursable purchases from unallowable purchases. The authorization for reimbursement can comprise a confirmation, a denial or a delay of authorization of reimbursement. The reimbursement processor can be configured to request additional information from the user to implement authorization for reimbursement. The reimbursement processor can be configured to receive authorization of reimbursement from a third-party entity. The reimbursement processor can be configured to forward reimbursable purchase data to a third-party entity. The reimbursement processor can be configured to store an amount for reimbursement. The reimbursement processor can be configured to aggregate a total amount of reimbursement from a plurality of purchase transactions. The reimbursement processor can be configured to aggregate a total amount of reimbursement on purchase transactions from a plurality of registered purchase accounts associated with the user. The reimbursement processor can be configured to classify purchase transactions from each of the plurality of registered purchase accounts associated with the user. Each classification can comprise a user transaction classification or a tentative user transaction classification.

According to the sixth aspect, the reimbursement processor can be configured to record a reimbursed amount and purchase transaction data associated with the reimbursed amount. The reimbursement processor can be configured to record a settlement transaction for the reimbursement. The settlement transaction can comprise complete reimbursements, pending reimbursements and/or partial reimbursements. A reimbursement can be performed through a funds transfer from the reimbursement account to the user. Alternatively, a reimbursement can be performed through a funds transfer from the reimbursement account into at least one settlement account. Alternatively, a reimbursement can be performed through a net settlement process. Additionally, a reimbursement can be performed by decrementing a value of the reimbursement account and incrementing a value of a settlement account. The reimbursement account can comprise a healthcare spending account, a dependent care account, a flexible spending account and/or a transit account. Alternatively, the reimbursement account can comprise a corporate expense account, a client expense account, and/or an employer's expense account. The funds transfer can comprise an automated clearing house transfer. Alternatively, the funds transfer can comprise a transfer of funds between accounts in different financial institutions. Alternatively, the funds transfer can comprise a transfer of funds between accounts within a financial institution.

According to the sixth aspect, the reimbursement processor can be configured to issue a reimbursement report to a payroll processor. The reimbursement processor can be configured to reverse a reimbursement transaction by withdrawing funds from the at least one settlement account when a disbursement overpayment occurs. The reimbursement processor can be configured to collect reimbursement funds from a plurality of reimbursement accounts into at least one settlement account. The reimbursement processor can be configured to deposit funds from the plurality of reimbursement accounts into at least one registered purchase account. A check, draft or a transfer of funds from the reimbursement account can be issued into a payroll account. The reimbursement processor can be configured to provide reimbursement information to at least the user. The reimbursement information can include allowed purchases, unallowed purchases, reimbursements, reimbursable amounts, requests, and/or information associated with the user. The reimbursement processor can be configured to reverse a payment transaction for an unallowable purchase. The reimbursement processor can be configured to reverse a disbursement when the disbursement was made for unallowable purchases. The reimbursement processor can be configured to report information associated with disbursements for unallowable purchases. The registered purchase account can comprise a credit card, a credit account, a debit card, a debit account, a customer loyalty card, a customer loyalty account or a vendor billing account. The credit card, the credit account, the debit card, the debit account, the customer loyalty card, the customer loyalty account or the vendor billing account can be configured to be identified as the registered purchase account.

According to a seventh aspect of the present invention, a system for conducting a financial transaction includes a purchase transaction data receiver. The purchase transaction data receiver is configured to receive purchase transaction data associated with at least one purchase transaction conducted by a user using a registered purchase account. The registered purchase account is issued with an absence of association to a reimbursement account. The at least one purchase transaction comprises at least one of reimbursable and unallowable purchases. The at least one purchase transaction creates an obligation upon the user of the registered purchase account to pay for the at least one purchase transaction with funds associated with the user. Collected purchase transaction data associated with the at least one purchase transaction is communicated to the purchase transaction data receiver. Subsequent to the issuance of the registered purchase account, an association is created between the registered purchase account and the reimbursement account for reimbursement transactions. The system includes a reimbursement processor in communication with the purchase transaction data receiver. The reimbursement processor is configured to identify purchases that are reimbursable from the purchase transaction data. The reimbursement processor is configured to implement authorization for reimbursement when there are identified reimbursable purchases. The identified reimbursable purchases are associated with the reimbursement account based upon the association between the registered purchase account and the reimbursement account.

According to an eighth aspect of the present invention, a system for conducting a financial transaction includes a purchase transaction data collector configured to collect purchase transaction data associated with a user. The purchase transaction data is associated with at least one purchase transaction conducted by the user using a registered purchase account. The registered purchase account is issued with an absence of association to a reimbursement account. The at least one purchase transaction comprises at least one of reimbursable and unallowable purchases. The at least one purchase transaction creates an obligation upon the user of the registered purchase account to pay for the at least one purchase transaction with funds associated with the user. The system includes a data transmission module in communication with the purchase transaction data collector and configured to transmit the collected purchase transaction data. Subsequent to the issuance of the registered purchase account, an association is created between the registered purchase account and the reimbursement account for reimbursement transactions. Purchases from the purchase transaction data are analyzed to determine reimbursable purchases and unallowable purchases. Authorization for reimbursement is initiated when there are reimbursable purchases. The reimbursable purchases are associated with the reimbursement account based upon the association between the registered purchase account and the reimbursement account.

According to the eighth aspect, the system can include a purchase transaction data analyzer. The purchase transaction data analyzer can be configured to receive the transmitted purchase transaction data. The purchase transaction data analyzer can be configured to analyze the received purchase transaction data. Incentives are provided to the user based on the analysis of the received purchase transaction data. The registered purchase account can comprise, for example, a merchant loyalty account. The collected purchase transaction data can be transmitted to a third-party entity. The third-party entity can forward the collected purchase transaction data to a reimbursement processor for analysis. The third-party entity can comprise, for example, a bank. The registered purchase account can comprise, for example, a credit card.

According to a ninth aspect of the present invention, a system for conducting a financial transaction includes a registered purchase account issuer module. The registered purchase account issuer module is configured to provide a registered purchase account to a user by a third-party entity. The registered purchase account issuer module is configured to issue the registered purchase account with an absence of association to a reimbursement account. The user uses the registered purchase account to conduct purchase transactions. The purchase transactions include at least one of reimbursable and unallowable purchases. The purchase transactions create an obligation upon the user of the registered purchase account to pay for the purchase transactions with funds associated with the user. The system includes a purchase transaction data collector module. The purchase transaction data collector module is configured to collect purchase transaction data associated with the purchase transactions on behalf of the third-party entity. The system includes a purchase transaction data analyzer module. The purchase transaction data analyzer module is configured to analyze purchase transactions from the purchase transaction data to determine reimbursable purchases and unallowable purchases. Subsequent to the issuance of the registered purchase account, an association is created between the registered purchase account and the reimbursement account for reimbursement transactions. Authorization for reimbursement is initiated when there are reimbursable purchases. The reimbursable purchases are associated with the reimbursement account based upon the association between the registered purchase account and the reimbursement account. The purchase transaction data analyzer module is configured to forward information associated with the analyzed purchase transaction data to the third-party entity. According to the ninth aspect, the third-party entity can comprise, for example, an employer of the user.

According to a tenth aspect of the present invention, a system for conducting a financial transaction includes means for collecting purchase transaction data associated with at least one purchase transaction conducted by a user using a registered purchase account. The registered purchase account is issued with an absence of association to a reimbursement account. The at least one purchase transaction comprises at least one of reimbursable and unallowable purchases. The at least one purchase transaction creates an obligation upon the user of the registered purchase account to pay for the at least one purchase transaction with funds associated with the user. Subsequent to the issuance of the registered purchase account, an association is created between the registered purchase account and the reimbursement account for reimbursement transactions. The system includes means for identifying purchases that are reimbursable from the purchase transaction data. The purchase identifying means is configured to receive the purchase transaction data from the purchase transaction data collecting means. The system includes means for implementing authorization for reimbursement when there are identified reimbursable purchases. The identified reimbursable purchases are associated with the reimbursement account based upon the association between the registered purchase account and the reimbursement account.

According to the tenth aspect, the system can include: means for conducting the at least one purchase transaction by the user using the registered purchase account at a registered vendor; and/or means for settling payment with the registered vendor for the at least one purchase transaction using an account other than the reimbursement account. The authorization implementing means can comprise means for facilitating authorization for reimbursement to at least one settlement account for the identified reimbursable purchases. The system can include: means for registering the reimbursement account, at least one settlement account and at least one registered purchase account for a user; means for registering at least one registered purchase account for a third party associated with the user; means for issuing a purchase account with the absence of association to the reimbursement account; and/or means for registering the purchase account. A re-affirmation of an agreement with the user, that reimbursable purchases made in connection with the registered purchase account will only be used for authorized purposes, is performed each time the registered purchase account is used. The registered purchase account can comprise, for example, a registered card. The system can include means for identifying the registered card that enables compliance with regulations relating to purchases. The registered card can comprise, for example, a bar code, a magnetic stripe, a chip or the like.

According to the tenth aspect, the purchase transaction data collecting means can be configured to forward the purchase transaction data in a secure format. The purchase transaction data collecting means can be configured to encrypt information associated with the registered purchase account. The system can include means for encrypting the purchase transaction data using a hashing function associated with the registered purchase account. The purchase transaction data collecting means can be configured to forward the purchase transaction data to the purchase identifying means substantially concurrently when the at least one purchase transaction is conducted. The purchase transaction data associated with the at least one purchase transaction can comprise a SKU, a UPC, a CPT, a quantity of items or services purchased, prices of the items or services purchased, taxes, delivery charges, and/or freight charges. The system can include: means for storing the purchase transaction data associated with the at least one purchase transaction; and means for aggregating purchase transaction data associated with a plurality of purchase transactions from a plurality of registered purchase accounts associated with the user.

According to the tenth aspect, the purchase identifying means can comprise means for applying business logic to identify purchases of the at least one purchase transaction that are reimbursable. Each of a plurality of reimbursement accounts can be associated with one of a plurality of rule sets. The business logic applying means can be configured to apply business logic according to each of the plurality of rule sets for each of the plurality of reimbursement accounts. The business logic applying means can comprise means for determining applicability of reimbursement of reimbursable purchases from unallowable purchases. The authorization implementing means can be configured to receive one of a confirmation, a denial and a delay of authorization of reimbursement. The system can include: means for requesting additional information from the user to implement authorization for reimbursement; means for receiving authorization of reimbursement from a third-party entity; means for forwarding reimbursable purchase data to a third-party entity; means for storing an amount for reimbursement; means for aggregating a total amount of reimbursement from a plurality of purchase transactions; means for aggregating a total amount of reimbursement on purchase transactions from a plurality of registered purchase accounts associated with the user; and/or means for classifying purchase transactions from each of the plurality of registered purchase accounts associated with the user. Each classification can comprise a user transaction classification or a tentative user transaction classification.

According to the tenth aspect, the system can include: means for recording a reimbursed amount and purchase transaction data associated with the reimbursed amount; and/or means for recording a settlement transaction for the reimbursement. The settlement transaction can comprise complete reimbursements, pending reimbursements and/or partial reimbursements. A reimbursement can be performed through a funds transfer from the reimbursement account to the user. Alternatively, a reimbursement can be performed through a funds transfer from the reimbursement account into at least one settlement account. Alternatively, a reimbursement can be performed through a net settlement process. Additionally, a reimbursement can be performed by decrementing a value of the reimbursement account and incrementing a value of a settlement account. The reimbursement account can comprise a healthcare spending account, a dependent care account, a flexible spending account and/or a transit account. The reimbursement account can comprise a corporate expense account, a client expense account, and/or an employer's expense account. The funds transfer can comprise an automated clearing house transfer. Alternatively, the funds transfer can comprise a transfer of funds between accounts in different financial institutions. Alternatively, the funds transfer can comprise a transfer of funds between accounts within a financial institution.

According to the tenth aspect, the system can include: means for issuing a reimbursement report to a payroll processor; means for reversing a reimbursement transaction by withdrawing funds from the at least one settlement account, when a disbursement overpayment occurs; means for collecting reimbursement funds from a plurality of reimbursement accounts into at least one settlement account; means for depositing funds from the plurality of reimbursement accounts into at least one registered purchase account; means for issuing a check, draft or a transfer of funds from the reimbursement account into a payroll account; and/or means for providing reimbursement information to at least the user. The reimbursement information can include allowed purchases, unallowed purchases, reimbursements, reimbursable amounts, requests, and/or information associated with the user. The system can include: means for reversing a payment transaction for an unallowable purchase; means for reversing a disbursement when the disbursement was made for unallowable purchases; and/or means for reporting information associated with disbursement for unallowable purchases. The registered purchase account can comprise a credit card, a credit account, a debit card, a debit account, a customer loyalty card, a customer loyalty account or a vendor billing account. The system can include means for identifying the one of the credit card, the credit account, the debit card, the debit account, the customer loyalty card, the customer loyalty account and the vendor billing account as the registered purchase account.

According to an eleventh aspect of the present invention, a system for conducting a financial transaction includes means for issuing a purchase account with an absence of association to a reimbursement account, and means for registering the purchase account. An association with the reimbursement account is formed for reimbursement transactions. The system includes means for conducting at least one purchase transaction by a user using the registered purchase account. The at least one purchase transaction comprises at least one of reimbursable and unallowable purchases. The at least one purchase transaction creates an obligation upon the user of the registered purchase account to pay for the at least one purchase transaction with funds associated with the user. The system includes means for collecting purchase transaction data associated with the at least one purchase transaction. The purchase transaction data collecting means is configured to forward the purchase transaction data. The system includes means for identifying purchases that are reimbursable from the purchase transaction data. The purchase identifying means is configured to receive the purchase transaction data forwarded from the purchase transaction data collecting means. The system includes means for implementing authorization for reimbursement when there are identified reimbursable purchases. The identified reimbursable purchases are associated with the reimbursement account based upon the association created between the registered purchase account and the reimbursement account.

According to a twelfth aspect of the present invention, a system for conducting a financial transaction includes means for collecting purchase transaction data associated with a user. The purchase transaction data is associated with at least one purchase transaction conducted by the user using a registered purchase account. The registered purchase account is issued with an absence of association to a reimbursement account. The at least one purchase transaction comprises at least one of reimbursable and unallowable purchases. The at least one purchase transaction creates an obligation upon the user of the registered purchase account to pay for the at least one purchase transaction with funds associated with the user. Subsequent to the issuance of the registered purchase account, an association is created between the registered purchase account and the reimbursement account for reimbursement transactions. The system includes means for analyzing the collected purchase transaction data. The purchase transaction data analyzing means is configured to analyze purchases from the purchase transaction data to determine reimbursable purchases and unallowable purchases. Authorization for reimbursement is initiated when there are reimbursable purchases. The reimbursable purchases are associated with the reimbursement account based upon the association between the registered purchase account and the reimbursement account.

According to the twelfth aspect, incentives can be provided to the user based on the analysis of the collected purchase transaction data performed by the purchase transaction data analyzing means. The registered purchase account can comprise, for example, a merchant loyalty account. The collected purchase transaction data can be provided to a third-party entity. The third-party entity can forward the collected purchase transaction data to the purchase transaction data analyzing means for analysis. The third-party entity can comprise, for example, a bank. The registered purchase account can comprise, for example, a credit card.

According to a thirteenth aspect of the present invention, a system for conducting a financial transaction includes means for issuing a registered purchase account to a user by a third-party entity. The registered purchase account is issued with an absence of association to a reimbursement account. The user uses the registered purchase account to conduct purchase transactions. The purchase transactions comprise at least one of reimbursable and unallowable purchases. The purchase transactions create an obligation upon the user of the registered purchase account to pay for the purchase transactions with funds associated with the user. The system includes means for collecting purchase transaction data associated with the purchase transactions on behalf of the third-party entity. The system includes means for analyzing purchase transactions from the purchase transaction data to determine reimbursable purchases and unallowable purchases. Subsequent to the issuance of the registered purchase account, an association is created between the registered purchase account and the reimbursement account for reimbursement transactions. Authorization for reimbursement is initiated when there are reimbursable purchases. The reimbursable purchases are associated with the reimbursement account based upon the association between the registered purchase account and the reimbursement account. The system includes means for communicating information associated with the analyzed purchase transaction data to the third-party entity. According to the thirteenth aspect, the third-party entity can comprise, for example, an employer of the user.

According to a fourteenth aspect of the present invention, a computer-readable medium contains a computer program for conducting a financial transaction. The computer program performs the steps of: receiving collected purchase transaction data associated with at least one purchase transaction conducted by a user using a registered purchase account, wherein the registered purchase account is issued with an absence of association to a reimbursement account, wherein the at least one purchase transaction comprises at least one of reimbursable and unallowable purchases, wherein the at least one purchase transaction creates an obligation upon the user of the registered purchase account to pay for the at least one purchase transaction with funds associated with the user, and wherein, subsequent to the issuance of the registered purchase account, an association is created between the registered purchase account and the reimbursement account for reimbursement transactions; identifying purchases that are reimbursable from the purchase transaction data; and facilitating authorization for reimbursement when there are identified reimbursable purchases, wherein the identified reimbursable purchases are associated with the reimbursement account based upon the association between the registered purchase account and the reimbursement account.

According to the fourteenth aspect, the at least one purchase transaction can be conducted by the user using the registered purchase account at a registered vendor. Payment can be settled with the registered vendor for the at least one purchase transaction using an account other than the reimbursement account. The computer program can perform the step of: facilitating authorization for reimbursement to at least one settlement account for the identified reimbursable purchases. The reimbursement account, at least one settlement account and at least one registered purchase account can be registered for a user. At least one registered purchase account can be registered for a third party associated with the user. A purchase account can be issued with the absence of association to the reimbursement account. The purchase account can be registered to generate the registered purchase account. A re-affirmation of an agreement with the user, that reimbursable purchases made in connection with the registered purchase account will only be used for authorized purposes, can occur each time the registered purchase account is used. The registered purchase account can comprise, for example, a registered card. A decal can be affixed to the registered card that enables compliance with regulations relating to purchases that initiate disbursements from the reimbursement account. The registered card can comprise, for example, a bar code, a magnetic stripe, a chip or the like.

According to the fourteenth aspect, the computer program can perform the steps of: issuing a command to transmit the purchase transaction data in a secure format; encrypting information associated with the registered purchase account; and encrypting the purchase transaction data using a hashing function associated with the registered purchase account. The purchase transaction data can be forwarded substantially concurrently when the at least one purchase transaction is conducted. The purchase transaction data associated with the at least one purchase transaction can comprise a SKU, a UPC, a CPT, a quantity of items or services purchased, prices of the items or services purchased, taxes, delivery charges, and/or freight charges. The computer program can perform the steps of: issuing a command to store the purchase transaction data associated with the at least one purchase transaction; and aggregating purchase transaction data associated with a plurality of purchase transactions from a plurality of registered purchase accounts associated with the user. The computer program can perform the step of: applying business logic to identify purchases of the at least one purchase transaction that are reimbursable. Each of a plurality of reimbursement accounts can be associated with one of a plurality of rule sets. The computer program can perform the steps of: applying business logic according to each of the plurality of rule sets for each of the plurality of reimbursement accounts; and determining applicability of reimbursement of reimbursable purchases from unallowable purchases.

According to the fourteenth aspect, the computer program can perform the steps of: receiving a confirmation, a denial or a delay of authorization of reimbursement; issuing a command to transmit a request for additional information from the user to implement authorization for reimbursement; receiving authorization of reimbursement from a third-party entity; issuing a command to transmit reimbursable purchase data to a third-party entity; issuing a command to store an amount for reimbursement; aggregating a total amount of reimbursement from a plurality of purchase transactions; aggregating a total amount of reimbursement on purchase transactions from a plurality of registered purchase accounts associated with the user; and/or classifying purchase transactions from each of the plurality of registered purchase accounts associated with the user. Each classification can comprise a user transaction classification or a tentative user transaction classification. The computer program can perform the steps of: issuing a command to record a reimbursed amount and purchase transaction data associated with the reimbursed amount; and/or issuing a command to record a settlement transaction for the reimbursement.

According to the fourteenth aspect, the settlement transaction can comprise complete reimbursements, pending reimbursements and/or partial reimbursements. A reimbursement can be performed through a funds transfer from the reimbursement account to the user. Alternatively, a reimbursement can be performed through a funds transfer from the reimbursement account into at least one settlement account. Alternatively, a reimbursement can be performed through a net settlement process. Additionally, a reimbursement can be performed by decrementing a value of the reimbursement account and incrementing a value of a settlement account. The reimbursement account can comprise a healthcare spending account, a dependent care account, a flexible spending account and/or a transit account. The reimbursement account can comprise a corporate expense account, a client expense account, and/or an employer's expense account. The funds transfer can comprise an automated clearing house transfer. Alternatively, the funds transfer can comprise a transfer of funds between accounts in different financial institutions. Alternatively, the funds transfer can comprise a transfer of funds between accounts within a financial institution.

According to the fourteenth aspect, the computer program can perform the steps of: issuing a command to initiate issuance of a reimbursement report to a payroll processor; and/or issuing a command to reverse a reimbursement transaction by withdrawing funds from the at least one settlement account, when a disbursement overpayment occurs. Reimbursement funds from a plurality of reimbursement accounts can be collected into at least one settlement account. Funds from the plurality of reimbursement accounts can be deposited into at least one registered purchase account. A check, draft or a transfer of funds can be issued from the reimbursement account into a payroll account. The computer program can perform the step of: issuing a command to transmit reimbursement information to at least the user. The reimbursement information can include allowed purchases, unallowed purchases, reimbursements, reimbursable amounts, requests, and/or information associated with the user. The computer program can perform the steps of: issuing a command to initiate reversal of a payment transaction for an unallowable purchase; issuing a command to initiate a reversal of a disbursement when the disbursement was made for unallowable purchases; and/or issuing a command to transmit a report of information associated with disbursement for unallowable purchases. The registered purchase account can comprise a credit card, a credit account, a debit card, a debit account, a customer loyalty card, a customer loyalty account or a vendor billing account. The credit card, the credit account, the debit card, the debit account, the customer loyalty card, the customer loyalty account or the vendor billing account can be identified as the registered purchase account.

According to a fifteenth aspect of the present invention, a computer-readable medium contains a computer program for conducting a financial transaction. The computer program performs the steps of: receiving collected purchase transaction data associated with a user, wherein the purchase transaction data is associated with at least one purchase transaction conducted by the user using a registered purchase account, wherein the registered purchase account is issued with an absence of association to a reimbursement account, wherein the at least one purchase transaction comprises at least one of reimbursable and unallowable purchases, wherein the at least one purchase transaction creates an obligation upon the user of the registered purchase account to pay for the at least one purchase transaction with funds associated with the user, wherein, subsequent to the issuance of the registered purchase account, an association is created between the registered purchase account and the reimbursement account for reimbursement transactions; and analyzing the collected purchase transaction data, wherein the purchase transaction data is analyzed to determine reimbursable purchases and unallowable purchases, wherein authorization for reimbursement is initiated when there are reimbursable purchases, and wherein the reimbursable purchases are associated with the reimbursement account based upon the association between the registered purchase account and the reimbursement account.

According to the fifteenth aspect, incentives can be provided to the user based on the analysis of the collected purchase transaction data. The registered purchase account can comprise, for example, a merchant loyalty account. The collected purchase transaction data can be provided to a third-party entity. The third-party entity can forward the collected purchase transaction data for analysis. The third-party entity can comprise, for example, a bank. The registered purchase account can comprise, for example, a credit card.

According to a sixteenth aspect of the present invention, a computer-readable medium contains a computer program for conducting a financial transaction. The computer program performs the steps of: issuing a command to initiate issuance of a registered purchase account to a user by a third-party entity, wherein the registered purchase account is issued with an absence of association to a reimbursement account, wherein the user uses the registered purchase account to conduct purchase transactions, wherein the purchase transactions comprise at least one of reimbursable and unallowable purchases, and wherein the purchase transactions create an obligation upon the user of the registered purchase account to pay for the purchase transactions with funds associated with the user; collecting purchase transaction data associated with the purchase transactions on behalf of the third-party entity; analyzing purchase transactions from the purchase transaction data to determine reimbursable purchases and unallowable purchases, wherein, subsequent to the issuance of the registered purchase account, an association is created between the registered purchase account and the reimbursement account for reimbursement transactions, wherein authorization for reimbursement is initiated when there are reimbursable purchases, and wherein the reimbursable purchases are associated with the reimbursement account based upon the association between the registered purchase account and the reimbursement account; and communicating information associated with the analyzed purchase transaction data to the third-party entity. According to the sixteenth aspect, the third-party entity can comprise, for example, an employer of the user.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIGS. 2A-2E are flowcharts illustrating steps for conducting a financial transaction, in accordance with an exemplary embodiment of the present invention.

DETAILED DESCRIPTION OF THE PREFERRED EMBODIMENTS

Figure 1:
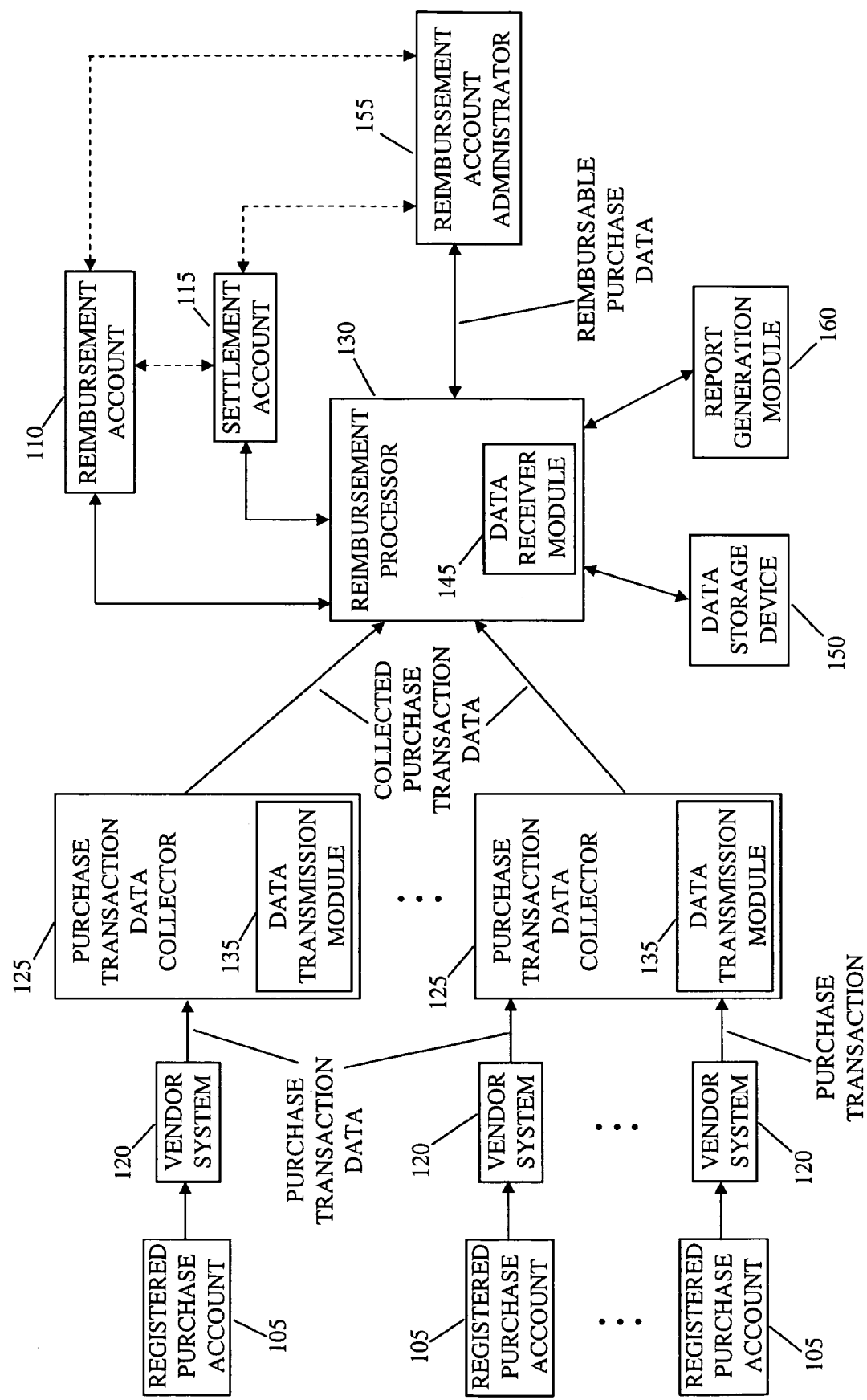
FIG. 1 is a block diagram illustrating a reimbursement system for conducting a financial transaction, in accordance with an exemplary embodiment of the present invention.

Exemplary embodiments of the present invention are directed to a reimbursement or secondary settlement process and processor for conducting a financial transaction. According to exemplary embodiments, a reimbursement or secondary settlement process is performed by a payment gateway, secondary settlement or reimbursement processor that enables an individual to register one or more restricted-use reimbursement account(s) and one or more electronic payment or other identifying account(s) (e.g., a bankcard, vendor loyalty card and the like). The reimbursement and identifying accounts are then linked to each other to automate the reimbursement for costs related to purchases of reimbursable (i.e., allowable) items. For example, an automated funds transfer can be used to debit a reimbursement account(s) pursuant to reimbursable purchases made in connection with an identifying account (or card). Such debited amounts (i.e., the reimbursements) can be credited to an account holder's general purpose account of their choosing.

According to exemplary embodiments, reimbursable and unallowable (i.e., non-reimbursable) items can be combined into a single purchase using customary or primary settlement processes. In one or more post-purchase reimbursement or secondary settlement steps, the reimbursement processor can separate the reimbursable from unallowable items, calculate the aggregate reimbursable amount(s) and transmit the data identifying such purchases to the reimbursement account administrator or trustee. Thus, reimbursements can be automated and "passive" with respect to the account holder, so that the purchase would not have to be manually split into multiple, distinct transactions that would slow checkout, and so that manually-submitted reimbursement requests are not necessary. In addition, a unique "primary account number" corresponds to each account holder, and is linked to one or more reimbursement accounts and one or more payment and/or other identifying accounts that can be maintained by the same or different vendors, banks and/or payment card issuers. Any or all purchase data detailing reimbursable purchases can be secured directly or indirectly from the vendor with or without supporting information from a bank that may have issued the linked payment account.

According to exemplary embodiments, an exchange of data is facilitated between the reimbursement processor and participating (i.e., registered) vendors that can enable a registered vendor to restrict its provision of proprietary sales data, while enabling the reimbursement processor as custodian of financial account information to avoid the dissemination of such information. For example, the registered vendor can provide the numbers of bankcard and/or loyalty card accounts that are used in connection with purchases. A linked cards database can be queried to identify matching accounts, returning notification of the matching pairs. The registered vendor can then extract and present the detailed sales (purchase) data related to the matching accounts (such data can be filtered by the vendor, for example, to exclude purchase information for obviously unallowable items, if desired). Any bankcard account information that was used to identify a reimbursable purchase on behalf of the cardholder can be removed from the purchase data and replaced with the primary account number prior to routing information to the reimbursement account administrator, so as to improve security of linked financial account information.

According to an exemplary embodiment of the present invention, the registered vendor can provide initial filters to reduce data describing the purchases to items that it determines may be reimbursable. The purchase data is then received and filtered by the reimbursement processor to select only reimbursable items so as to present to the reimbursement account only purchases that meet required business decision criteria, including, for example, allowable items, quantities, vendors and the like. Purchase data that is allowed for reimbursement can be forwarded to the reimbursement account administrator, where additional business rules can further reduce the reimbursement amount. Administrators can also route transactions to multiple secondary reimbursement accounts based on customizable decision criteria. Funds can be reimbursed via multiple means, including check, electronic funds transfer, automated clearing house, and the like. Unallowable purchases using the reimbursement account's restricted funds (in the case of a payment directly from the account to a vendor) can be charged to a linked account if the administrator of the reimbursement account deems the purchase to be unallowable.

It should be understood that the filtering function described above that can be performed by the reimbursement processor can also be performed, under certain circumstances, by the registered vendor, the reimbursement account administrator or even another third party participant whose sole function could be to conduct all or a portion of these filtering functions to determine or select only reimbursable items so as to present to the reimbursement account only purchases that meet required business decision criteria, including, for example, allowable items, quantities, vendors and the like.

Thus, according to exemplary embodiments, otherwise unrelated and multiple primary payment cards from multiple issuers can be linked to one or more reimbursement accounts that initiate the application of business rules to authorize reimbursements. Consequently, a single transaction can be performed at the point of sale, including both reimbursable and unallowable items, whereby reimbursement can be fully or partially settled by multiple reimbursements accounts depending on business rules applied based on the items and/or services purchased (i.e., at the line item level).

These and other aspects of the present invention will now be described in greater detail. FIG. 1 is a block diagram illustrating a secondary settlement or reimbursement system 100 for conducting a financial transaction, in accordance with an exemplary embodiment of the present invention. A user, such as, for example, an account holder, an affiliate (e.g., a family member) or other person or entity acting on behalf of the account holder or the like, is issued a purchase account. The purchase accounts need not be issued to the user in connection with the user's employment, in connection with a restricted account (e.g., employer expense account, a business account, and a pretax health spending account, etc.), nor in connection with a fiduciary relationship, but can be any suitable type of purchase account including personal identification cards, and general credit, debit and loyalty accounts and cards.

The user registers the purchase account, either directly or indirectly, and either electronically or manually, with the reimbursement system 100 to generate a registered purchase account 105. The registered purchase account 105 is owned or used by or otherwise associated with the user or a person or entity affiliated with the user (e.g., a family member or the like), and not a third party. The registered purchase account 105 can be any type of account that can be used by the user in connection with purchases made at registered vendors, including, for example, to settle payment with those registered vendors using funds associated with the user from an account other than a reimbursement account. As used herein, a "registered vendor" is any suitable type of vendor, merchant or other third-party with whom a relationship has been created with the reimbursement system 100, for example, by establishing a contract or other binding relationship between the vendor and the reimbursement system 100 whereby the vendor is approved and becomes an authorized "member" of or participant in the reimbursement system 100. As an authorized member or participant in the reimbursement system 100, the registered vendor adheres and complies to the requirements of membership, such as, for example, providing the required information discussed below to the reimbursement system 100 and the like. According to an alternative exemplary embodiment, a vendor can be registered with the reimbursement system 100 without an explicit registration. For example, the reimbursement system 100 can collect or receive the required information from a vendor or otherwise interact with the vendor without the vendor's explicit knowledge, thereby making the vendor a "registered vendor."

According to exemplary embodiments, the registered purchase account 105 can comprise any suitable type of registered card, registered account or the like. For example, the registered purchase account 105 can be any suitable type of card or account issued in connection with a debit account, credit account, customer loyalty account, charge account, expense account, vendor billing account, a government or employer issued identification, insurance or other identifying account or the like, such as, for example, a general purpose credit card or account, a general purpose debit card or account, a customer loyalty card or account or the like. For example, a customer loyalty account is an account for use by a vendor or other third party for collecting or otherwise aggregating purchases and purchase data to identify purchases associated with the loyalty account. For example, a registered card can be any suitable type of card or the like that is capable of containing a bar code, a magnetic strip, a computer chip or any other suitable means of storing or otherwise maintaining electronically-readable identifying information on the card. According to an alternative exemplary embodiment, a registered purchase account 105 can be represented by a biometric, "challenge response," or other suitable form of identification. Any number of purchase accounts can be registered to generate an equivalent number of registered purchase accounts 105, although two or more purchase accounts can be registered to form a single registered purchase account 105.

In addition to the one or more registered purchase accounts 105, a user registers one or more reimbursement accounts 110 (either electronically or manually) with the reimbursement system 100. A reimbursement account 110 can be any type of restricted-use account (e.g., an account containing funds that can only be used for certain specified purposes) associated with a user from which funds can be withdrawn to pay for reimbursable or otherwise allowable purchases or expenditures. The reimbursement account 110 can comprise an employee benefit account, such as, for example, any suitable type of flexible spending account, healthcare spending account, dependent care account, transit account or the like, corporate expense account, client expense account, employer's expense account or the like. For example, the reimbursement account 110 can comprise an IRS Section 125 account or the like. According to an alternative exemplary embodiment, a reimbursement account 110 can be registered as a registered purchase account 105. However, use of such a registered purchase account 105, for example, would not initiate reimbursement of funds to the user.

According to exemplary embodiments, the purchase account is issued to the user without an association to a reimbursement account 110. As used herein, a purchase account is "issued" when the purchase account is activated or otherwise available for use by the user or an affiliate on the user's behalf. Thus, when the purchase account is issued, there is initially no linking or other association between the purchase account and one or more reimbursement accounts 110. However, subsequent to the issuance of the purchase account, such as, for example, as part of the process of registering the purchase account, the registered purchase account 105 is linked or otherwise associated with a corresponding reimbursement account 110 for purposes of reimbursement transactions. Exemplary embodiments of the present invention create an association or link (either directly or indirectly) after the original purchase accounts are issued between otherwise unrelated and multiple registered purchase accounts 105 (e.g., primary payment cards from multiple issuing banks) and one or more reimbursement accounts 110. However, according to an alternative exemplary embodiment, the purchase account can be issued in connection with a reimbursement account 110. According to an exemplary embodiment, a unique "primary account number" can be assigned to each user. The primary account number can be linked to the one or more reimbursement accounts 110 and one or more registered purchase accounts 105 that can be maintained by the same or different vendors and/or banks, such as with electronic wallet service providers.

According to an exemplary embodiment, a decal, label or other identifying means can be permanently affixed to the registered purchase account 105 (e.g., to the registered card) to enable compliance with regulations relating to purchases made with funds from reimbursement accounts 110 (e.g., an agreement or other affirmation required by the IRS for purchases that use funds from pretax health spending accounts or the like). The decal or other identifying means indicates the user's agreement to be bound by the regulations related to each reimbursement account 110 and to identify participation in the reimbursement system 100. In other words, each time the registered purchase account 105 is used by the user, the decal or other identifying means affixed to the registered purchase account 105 provides a re-affirmation of an agreement with the user that reimbursable purchases made in connection with the registered purchase account 105 will only be used for authorized purposes. The agreement (e.g., a contract) can be signed by the user as part of the process of registering a purchase account, and the decal or other identifying means can provide a reminder to the user of the existence of and conditions and terms of that agreement.

As part of the registration process, the user also registers one or more settlement accounts 115, either electronically or manually. A settlement account 115 is an account, associated with the user, into which reimbursement funds from the one or more reimbursement accounts 110 are transmitted pursuant to all authorized reimbursement transactions. For example, the settlement account 115 can be the account represented by the registered purchase account 105 (e.g., a credit card account). However, the settlement account 115 can be any general or specific purpose account of the user's choosing. According to an alternative exemplary embodiment, the settlement account 115 can be a process or indication whereby a reimbursement account administrator pays reimbursements by, for example, check or draft to the user, and the user then determines into which (general purpose) account the funds are to be deposited. Consequently, after the registration process performed according to exemplary embodiments of the present invention, at least one registered purchase account 105, at least one reimbursement account 110, and at least one settlement account 115 will be associated with a user and each registered purchase account 105 will be associated with the other registered purchase accounts 105.

According to an alternative exemplary embodiment, although the user can register at least one registered purchase account 105, a third party associated with the user can also register a registered purchase account 105. For example, a family member of the user, an individual designated by the user (e.g., a friend, the user's lawyer, or other individual with, for example, a power of attorney from the user), or an entity on behalf of the user can register a registered purchase account 105 associated with the user, so long as the third party registration does not violate, for example, the terms of the use of the user's reimbursement account or conditions for reimbursement. In addition, a settlement account 115 need not be registered if the reimbursement system 100 does not perform a settlement transaction (e.g., the settlement transaction is performed by a third party).

According to exemplary embodiments, the user conducts at least one purchase transaction using the registered purchase account 105. The at least one purchase transaction can be comprised of any combination of items, goods, services or any other form of merchandise that is capable of being purchased by a user using the registered purchase account 105. It should be noted that an association is created between the at least one purchase transaction and the registered purchase account 105 as a result of the purchase of those items and/or services made in connection with the registered purchase account 105. The at least one purchase transaction is conducted by the user at a registered vendor. As discussed previously, a merchant or vendor that participates in the reimbursement system 100 is considered a registered vendor. A registered vendor also integrates its systems with that of the reimbursement system 100 for the purposes of exchanging data describing purchase transactions, processing business logic relating to purchases, and any reporting that the registered vendor can facilitate in connection with the reimbursement system 100. The registered vendor can have developed or customized systems to collect data that can be transmitted, and systems that can filter collected data so that obviously irrelevant data would not be transmitted. Using the registered purchase account 105, a user can conduct a purchase transaction at a registered vendor using any suitable type of registered vendor system 120. Each registered vendor system 120 can comprise, for example, an electronic payment system, a customer loyalty incentive system, a customer billing and/or merchandising system, or any other suitable type of point-of-sale ("POS") system.

In addition, the reimbursement system 100 can promote the use of registered vendors that are participating in the reimbursement system 100. For example, user can be encouraged to use any of multiple registered purchase accounts 105 through promotions including, but not limited to, advertising, issuance or facilitation of discount coupons. A brand name and/or brand logo can be used to identify the reimbursement system 100 (or network) with which such registered vendors participate. According to exemplary embodiments, the financial institution and/or administrator that issues or promotes the issuance of the purchase accounts need not explicitly authorize, nor be aware of, the use of the corresponding registered purchase accounts 105 in the reimbursement system 100.

Thus, for purposes of illustration and not limitation, the user can make at least one purchase transaction at a vendor that is a registered participant of the reimbursement system 100 (i.e., a registered vendor) by presenting a registered card or biometric or other identifier as the registered purchase account 105 to the registered vendor. Account information contained on or identified by the registered card is input into the registered vendor's POS or other registered vendor system 120 by manually entering such information, or electronically reading such information with equipment capable of interpreting the bar code, magnetic stripe, computer chip or other storage or biometric means in the registered card. Thus, a registered vendor's customer loyalty system or billing system or other system that records purchase transactions can be used to track transactions involving the user's unique primary account number(s), and be used as a source of purchase transaction data.

According to exemplary embodiments, the at least one purchase transaction comprises reimbursable and/or unallowable purchases. In other words, the purchase could, and is generally intended to, contain items, services and the like that are reimbursable and/or items, services and the like that are unallowable for reimbursement from any registered reimbursement account 110. However, the user is not required to separate reimbursable purchases from unallowable purchases before the purchase transaction takes place, as all items and/or services can be grouped into a single purchase transaction. In other words, a single transaction can be conducted at the point of sale whereby the electronic reimbursement will be settled by one or more reimbursement accounts depending on business rules applied from each account and based on the items and/or services purchased (i.e., at the line item level).

According to exemplary embodiments, the at least one purchase transaction creates an obligation upon the user of the registered purchase account 105 to pay for the at least one purchase transaction with funds associated with the user from an account other than the reimbursement account 110. Thus, the user (i.e., the holder of the registered purchase account 105), and not a third party, is obligated to pay for the purchases (e.g., through or to a creditor) using funds owned or otherwise in the possession of the user or a family member or other person affiliated with the user, but which are different and separate from any funds that may be available in one or more reimbursement accounts 110. In addition, payment is settled with the registered vendor for the at least one purchase transaction using an account other than the reimbursement account 110, such as, for example, by cash, check, bankcard, a billing account or the like. Based on business rules relating to one or more reimbursement accounts 110, reimbursable and unallowable items can be combined at time of purchase, using customary vendor settlement processes with a single payment tender from an unrestricted payment account, check or cash, so that at the point and time of sale neither the user nor the registered vendor need separate purchases that are allowable from those that are not. In other words, the registered vendor processes payment for the purchase in a customary way, and independent of the reimbursement system 100, except for the collection of purchase transaction data, as discussed below. This is referred to as the "primary settlement process." In the case of bankcard transactions, the registered vendor can settle purchase transactions using its customary merchant acquirer, merchant payment processor and bankcard association (or network), typically without the need for such financial and transaction service providers to be aware of the fact that such purchase transactions are related to a reimbursement that may be processed by the reimbursement system 100. In addition, the primary settlement process occurs independently of the reimbursement or reimbursement process discussed herein.

According to exemplary embodiments, the registered vendor collects and transmits purchase transaction data relating to purchases performed with a registered purchase account 105. Thus, the system 100 includes a purchase transaction data collector 125. The purchase transaction data collector 125 is configured to collect purchase transaction data associated with the at least one purchase transaction. The purchase transaction data can be comprised of any appropriate type of information that can be associated with a purchase transaction, including, but not limited to, one or any combination of an identification number, such as, for example, a SKU, a UPC, and/or a CPT, a quantity of items or services purchased, prices of the items or services purchased, taxes, delivery charges, freight charges and the like. Collection of data can be directly from the electronic payment transaction, through customized systems designed for the purpose of collecting such data, from a preexisting system (for example, a registered vendor's merchandizing, billing or customer loyalty incentive systems), or the like. Each registered vendor system 120 is in communication with a purchase transaction data collector 125. For example, a single purchase transaction data collector 125 can be in communication with a single registered vendor system 120. Alternatively or additionally, a single purchase transaction data collector 125 can be in communication with multiple or all registered vendor systems 120.

According to one exemplary embodiment, purchase transaction data can be stored by the vendor using the respective purchase transaction data collector 125 and then forwarded in batches by the purchase transaction data collector 125 any time after the purchases are made. Alternatively, purchase transaction data can be sent in real-time or near real-time as purchases are made and purchase transactions are conducted. Each purchase transaction data collector 125 can be configured to filter the purchase transaction data for the registered vendor before forwarding. The filtering can be used, for example, to remove information that is not applicable to reimbursement processes or to registered reimbursement accounts 110, or to reduce the purchase transaction data to purchases that the registered vendor determines may be reimbursable According to an exemplary embodiment, the purchase transaction data can be forwarded in a secure format. For example, the purchase transaction data can be encrypted using any suitable encryption technique, such as, for example, a public key infrastructure (PKI) system, or any other suitable form of symmetrical or asymmetrical encryption. In addition, information associated with the registered purchase account 105, such as, for example, personal and/or financial information of the user and the like, can be encrypted and forwarded along with the encrypted purchase transaction data. According to one exemplary embodiment, the purchase transaction data and/or information associated with the registered purchase account 105 can be encrypted using, for example, a hashing function or similar encryption technique associated with the registered purchase account 105. In other words, the encryption technique used to encrypt the information can be associated with and specific to each registered purchase account 105.

For example, if a PKI system is used, then the public key of a public key-private key pair generated for a registered purchase account 105 can be used to encrypt the information before forwarding. For example, the registered vendor or third-party system can cause linked bankcard numbers to be converted into a secure but recognizable format by using encryption or otherwise manipulating or translating the number (e.g., obscuring certain of the account number's digits, or using a combination of the name of the cardholder appearing on the card in combination with reduced set of the bankcard's digits). However, any financial information that can be used to identify a reimbursable purchase on behalf of the user can be removed from the purchase transaction data and replaced with the user's primary account number prior to forwarding, so as to improve the security of linked financial account information. Thus, purchase transaction data related to such linked financial information can be associated with a unique user primary account number.

The system 100 includes a reimbursement processor 130 in communication with the purchase transaction data collector 125. The reimbursement processor 130 is configured to receive the purchase transaction data from the purchase transaction data collector 125. For example, the registered vendor can first transmit all identification and account numbers that are used in connection with the purchase transactions during a period specified by the reimbursement processor 130. The reimbursement processor 130 can respond to an account number list by sending a list that specifies those account numbers that were transmitted by the registered vendor and that match any registered purchase accounts 105. The registered vendor can then transmit the purchase transaction data related to the registered purchase accounts 105, including such information as product or service ID (SKU, UPC, CPT or other identifying product or service codes), the quantity of items or services purchased, price, taxes, delivery/freight charges, and any and all other information required by the reimbursement processor 130 for reimbursement processing. Alternatively, the purchase transaction data can be forwarded substantially concurrently to the reimbursement processor 130 from the purchase transaction data collector 125 when the at least one purchase transaction is conducted (e.g., in real-time or near real-time), although the purchase transaction data can be forwarded at any time after the at least one purchase transaction is conducted. However, any or all purchase transaction data that is forwarded by the registered vendor occurs independently of the knowledge of the financial institution that may have issued a purchase account, or any third-party payment processor that may administer such purchase account.

According to an exemplary embodiment, one or more purchase transaction data collectors 125 can be configured to collect purchase transaction data from the registered vendor systems 120 and forward or otherwise transmit that data to the reimbursement processor 130. In such a configuration, the purchase transaction data collector 125 can include, or be in communication with, a data transmission module 135. The data transmission module 135 is configured to communicate the purchase transaction data, and any accompanying information collected by the purchase transaction data collector 125, to the reimbursement processor 130 over a communication channel 140 using any suitable communication technique appropriate for communication of information over the communication channel 140. The data transmission module 135 is also configured to receive information from the reimbursement processor 130 over the communication channel 140. In addition, in such a configuration, the reimbursement processor 130 can include, or be in communication with, a data receiver module 145. The data receiver module 145 is configured to receive information communicated from the purchase transaction data collector 125 via data transmission module 135. The data receiver module 145 is also configured to communicate information to the purchase transaction data collector 125 via the communication channel 140.

According to an alternative exemplary embodiment, the purchase transaction data collector 125 can form a portion of or be located locally to the reimbursement processor 130. In such a configuration, each of the registered vendor systems 120 can transmit or otherwise communicate the purchase transaction data and any accompanying information to the data transmission module 135 of purchase transaction data collector 125 using one or more respective communication channels. If the purchase transaction data collector 125 forms a portion of the reimbursement processor 130, either the data transmission module 135 or the data receiver module 145 would not be necessary, because one of the two modules can be configured to perform the communication (transmission and receiving) functions on behalf of the reimbursement processor 130.

The system 100 can include a data storage device 150 in communication with the reimbursement processor 130. The reimbursement processor 130 is configured to store the purchase transaction data and any other information received from one or more registered vendors using the data storage device 150. Consequently, the reimbursement processor 130 is configured to aggregate purchase transaction data associated with one or more purchases performed using one or more registered purchase accounts 105 associated with each unique user. In other words, purchase transaction data is aggregated for each user. Using the collected and aggregated purchase transaction data for each user, the reimbursement processor 130 is configured to identify purchases (including any or all related costs and other descriptive information) that are reimbursable from the purchase transaction data. Such processing is referred to herein as "first stage reimbursement authorization." Thus, from the collected purchase transaction data for a user, the reimbursement processor 130 is configured to separate reimbursable purchases from unallowable purchases.

The reimbursement processor 130 is configured to classify purchase transactions from each of the plurality of registered purchase accounts 105 associated with the user. Each classification can include either a user transaction classification (e.g., a definite or highly-confident classification) or a tentative user transaction classification. In the first stage reimbursement authorization, purchase transaction data representing purchased items is parsed into categories of purchased items that are: a.) reimbursable; b.) those that may be reimbursable, but need additional input prior to authorization; or c.) those that are unallowable. Consequently, with respect to the user, reimbursement requests (or claims) can be passive and automated, so that a manual submission of purchase receipts for reimbursement requests would not be necessary. The reimbursement processor 130 can perform the identification in many ways. For example, a look-up table can be maintained by the reimbursement processor 130 (e.g., in the data storage device 150). The look-up table can list products and services by product or service ID (e.g., SKU, UPC, CPT or other identifying product or service codes). Each product or service can be designated as "allowable," "tentatively allowable," or "unallowable" in the table, based on factors such as, for example, the type and kind of reimbursement account 110 maintained by the user. The reimbursement processor 130 can then look up a product or service using the corresponding product or service ID to determine whether the product or service is "allowable," "tentatively allowable," or "unallowable." The look-up table could be generated and dynamically updated by the reimbursement processor 130, or provided by the organization or entity with which the reimbursement account 110 is maintained. Alternatively, for each purchase, the reimbursement processor 130 can query one or more appropriate databases, maintained either locally or remotely, that contain listings of which products and services are allowable. Other means of performing the identification of reimbursable or otherwise allowable purchases are possible.

For example, according to an exemplary embodiment of the present invention, the reimbursement processor 130 is configured to apply business logic to identify purchases of the at least one purchase transaction that are reimbursable. In other words, the business logic is applied to determine the applicability of reimbursement of reimbursable purchases from unallowable purchases. For example, rule or logic sets can be created pursuant to the rules of the one or more reimbursement accounts 110 associated with the user. The reimbursement processor 130 can apply the aggregated purchase transaction data to one or more rule sets to determine whether each purchase is reimbursable or unallowable.

For purposes of illustration and not limitation, suppose a reimbursement account 110 only provides for reimbursement of prescription medication if the medication is a generic brand. A logical rule in a rule set can be created for the corresponding reimbursement account 110 for this case. For example, given a purchased product "A," the rule can specify that if product "A" is a prescription medication, and if product "A" is a generic brand, then the purchase is reimbursable, otherwise the purchase is unallowable. Many such logical rules, of varying complexity, can be created. The complexity of each rule set and the logical rules that comprise each rule set will depend on, for example, the type of reimbursement account 110, the rules established for the reimbursement account 110, the types of products and/or services that can be covered for reimbursement by the reimbursement account 110 and other like factors.

A single rule set can be created for all or any combination of the reimbursement accounts 110. According to an alternative exemplary embodiment, however, each of a plurality of reimbursement accounts 110 can be associated with one of a plurality of rule sets. Thus, each reimbursement account 110 would have a corresponding rule set. Accordingly, the reimbursement processor 130 is configured to apply the appropriate rule set that corresponds to the given reimbursement account 110 to identify reimbursable or otherwise allowable purchases. To determine which rule set to apply, the reimbursement processor 130 can select the appropriate reimbursement account 110 based upon the registered purchase account 105 used to make the given purchase(s). According to exemplary embodiments, as a result of the association created between the registered purchase account 105 and the reimbursement account 110, the purchases made with the registered purchase account 105 can also be associated with the appropriate reimbursement account 110. Thus, identified reimbursable purchases are associated with the appropriate reimbursement account 110 based upon the association between the reimbursement account 110 and the registered purchase account 105 used to perform the purchases.

If the reimbursement processor 130 has identified reimbursable purchases from the collected and aggregated purchase transaction data, the reimbursement processor 130 is configured to implement or otherwise facilitate authorization for reimbursement. According to an exemplary embodiment, the reimbursement processor 130 can be configured to authorize the reimbursement itself (e.g., on behalf of the organization or other entity that maintains the reimbursement account 110). According to an alternative exemplary embodiment, the reimbursement processor 130 can be configured to forward reimbursable purchase data to a third party entity, such as, for example, a reimbursement account administrator 155 or other administrative entity associated with the reimbursement account(s) 110 for which reimbursable purchases have been identified. This is referred to herein as "second stage reimbursement processing." Either the reimbursement processor 130 or the reimbursement account administrator 155 can perform one of several actions based upon the reimbursable purchase data, including confirmation, denial, or delay of authorization of reimbursement.

For example, the reimbursable purchase data can be submitted to the reimbursement account administrator 155 who can further analyze the reimbursable purchase data to determine the applicability of any reimbursement. The reimbursement account administrator 155 can then confirm approval, deny or delay reimbursement processing pending receipt and/or analysis of additional information. If additional information is needed from the user before reimbursements can be authorized, the reimbursement processor 130 (e.g., on behalf of the reimbursement account administrator 155) can be configured to request additional information from the user to implement authorization for reimbursement, for example, by generating a request to the user by electronic or postal mail. Alternatively, authorization can be delayed pending the completion of a manual process (i.e., without prior input from the reimbursement account administrator 155). In such an exemplary embodiment, manual confirmation by the user or other third-party would be necessary for authorization. For example, the reimbursement processor 130 can be configured to receive authorization of reimbursement from a third party entity, such as a family member of the user, an employer of the user, and the like.

After all second stage reimbursement authorization is complete, the aggregate cost of authorized and confirmed reimbursable purchases is calculated. Thus, the reimbursement processor 130 is configured to aggregate a total amount of reimbursement from a plurality of purchase transactions from one or more registered purchase accounts 105 associated with the user. The reimbursement processor 130 also stores or otherwise records (e.g., in data storage device 150) an amount of reimbursement. Thus, the reimbursement processor 130 records the reimbursable amount related to all purchase transaction data, as well as the purchase transaction data associated with the reimbursed amounts. The reimbursement processor 130 is further configured to prepare and record a settlement transaction for the reimbursement(s). Each settlement transaction can comprise, for example, a complete reimbursement, a pending reimbursement and/or a partial reimbursement.

The reimbursements can be performed in several ways, each being initiated by, for example, the reimbursement processor 130. For example, the reimbursement can be performed through a funds transfer from the reimbursement account 110 (directly) to the user, to a user's general purpose account or the like. Alternatively, the reimbursement can be performed through a funds transfer from the reimbursement account 110 into at least one settlement account 115. The funds transfer can comprise any suitable form of funds transfer, such as, for example, an electronic funds transfer ("EFT") using an automated clearing house ("ACH") or other form of electronic transfer, a transfer of funds between accounts in different financial institutions, a transfer of funds between accounts within a financial institution, and the like. Alternatively, the reimbursement can be performed through a net settlement process. Additionally, a reimbursement can be performed by decrementing a value of the reimbursement account 110 and incrementing a value of the settlement account 115. For each of these embodiments, the reimbursement processor 130 can be configured to collect reimbursement funds from a plurality of reimbursement accounts 110 and then transfer those collected funds into at least one settlement account 115, or facilitate issuance of a check or draft as a means of performing reimbursement.

According to exemplary embodiments, the reimbursement processor 130 can be configured to facilitate reimbursement to at least one settlement account 115 for the identified reimbursable purchases. For example, the reimbursement processor 130 can prepare a debit transaction equal to the reimbursable amount, or, if the financial transaction capabilities enable it, and if less, the available balance of the reimbursement account 110. Such a debit transaction can occur in the form of, for example, an EFT using the ACH. Each debit transaction can settle into one or more settlement accounts 115 managed by the reimbursement processor 130 or other fiduciary, and simultaneously or subsequently, an amount equal to the debit transaction, less any fees and/or offsets that may apply, can be transmitted to the user or to the recipient of any such fees and/or offsets. For example, if to the user, an EFT can be performed into the user's registered settlement account(s) 115. Alternatively, the reimbursement processor 130 can be configured to transmit funds or payment instructions and/or information to an employer's payroll account for further credit to the user as a part of user's normal payroll distribution. The reimbursement processor 130 can be configured to prepare and issue a draft or check to be deposited into the preferred account of the user's choosing. For example, the reimbursement processor 130 can be configured to issue a check or draft or initiate a transfer of funds from the reimbursement account 110 into a payroll account of, or associated with, the user. If the debit transaction is transmitted to the recipient of the fees and/or offsets, the settlement can be in the form of, for example, an EFT, check or draft for the benefit of such recipient.

As discussed previously, according to an alternative exemplary embodiment, a registered purchase account 105 can comprise, for example, a registered card that is a payment card that is: a.) issued in connection with a restricted account that is a reimbursement account 110 (e.g., a corporate purchase card for which payment is made or guaranteed by the employer, or a debit card that is issued in connection with a restricted pretax health spending account); and b.) used to make a purchase at a registered vendor. In such an embodiment, the reimbursement processor 130 can perform the steps and functions described previously, up to settlement of confirmed reimbursable amounts. In such an embodiment, to settle confirmed reimbursable amounts, the reimbursement processor 130 can automatically reverse payments for unallowable purchases that were made with the restricted funds by first debiting one of the user's general purpose registered purchase accounts 105, crediting the appropriate reimbursement account 110, and then recording the transaction. Alternatively, a negative reimbursable balance can be stored by the reimbursement processor 130 that can be used to offset future reimbursement payments, i.e., a net settlement process.

Thus, the reimbursement processor 130 is configured to reverse a payment transaction for an unallowable purchase, reverse a reimbursement transaction by withdrawing funds from the at least one settlement account 115 when a disbursement overpayment occurs, or reverse a disbursement when the disbursement was made for unallowable purchases. To perform the reverse disbursement transaction, the reimbursement processor 130 can, for example, debit funds from the settlement account into which the funds were originally transferred and then credit the appropriate reimbursement account(s) 110, or initiate a reverse funds transfer (e.g., a reverse EFT using an ACH). Furthermore, the reimbursement can be settled in a lesser amount than the reimbursable amount, as determined by the reimbursement business logic. For example, the reduction can be due to reasons including, but not limited to, offsetting other amounts owed to the settlement account 115 by the recipient of the reimbursement, insufficient funds to satisfy the total demand, recipient request and the like. The reimbursement processor 130 can also report the use of restricted funds for unallowable purchases to the reimbursement account administrator 155 and/or the user, thereby enabling the manual correction of the discrepancy. The reimbursement processor 130 would then record such transaction. Thus, the reimbursement processor 130 can be configured to report information associated with disbursements for unallowable purchases, or any other suitable information.

After the reimbursement is performed, reimbursement settlement information can be recorded and reported. For example, the reimbursement processor 130 can be configured to provide reimbursement information to the user, the reimbursement account administrator 155 or the like. The reimbursement information can include, for example, allowed purchases, unallowed purchases, payment or disbursement reversals, reimbursements, reimbursable amounts, requests, information associated with the user, and the like. The reimbursement processor 130 can be configured to issue a reimbursement report, purchase transaction information or other related information to the user, the reimbursement account administrator 155, a designated third party, a payroll processor (e.g., associated with the user's employer), or any other individual or entity using a report generation module 160. For example, the reimbursement report can be issued to the payroll processor so that the payroll processor can provide funds that can be called out on a user's paycheck as a means of settlement. The report generation module 160 is configured to issue reports in both soft copy (e.g., as displayed through a suitable graphical user interface, sent in an e-mail, and the like) or hard copy (e.g., a print out via a suitable printer that can be viewed by or mailed to the user).

The reimbursement system 100 can also include any suitable type of graphical user interface configured to provide access to, either locally or remotely, and management of information associated with the user. Thus, the graphical user interface can be, for example, any suitable Web browser, e-mail application or the like that can support secure connections and remote access to the reimbursement system 100. The graphical user interface can be displayed on any suitable computer display, personal data assistant (PDA), telephone, monitor or the like capable of displaying graphical and/or textual information to a user and that allows a user to enter information (e.g., commands, information and the like) through, for example, a keyboard, a touch-screen, any type of pointing device, electronic pen, and the like. The graphical user interface can be used by the user, a third party, the reimbursement account administrator 155 or the like to access, control and/or manage any and all of the functionality of the reimbursement system 100, including viewing and managing the purchase transaction data, reimbursement information and the like. According to an alternative exemplary embodiment, the user can interact with the reimbursement system 100 in audio format through an interactive voice response (IVR) system or the like.

Each of modules of the reimbursement system 100, including the purchase transaction data collector 125, the reimbursement processor 130, the data transmission module 135, the data receiver module 145, and the report generation module 160, or any combination thereof, can be comprised of any suitable type of electrical or electronic component or device that is capable of performing the functions associated with the respective element. According to such an exemplary embodiment, each component or device can be in communication with another component or device using any appropriate type of electrical connection that is capable of carrying electrical information. Alternatively, each of the modules of the reimbursement system 100 can be comprised of any combination of hardware, firmware and software that is capable of performing the function associated with the respective module. In addition, communication channel 140 can be comprised of any suitable type of communication medium or channel capable of transmitting and receiving electronic information.

Alternatively, any combination or all of the modules of the reimbursement system 100 can be comprised of a microprocessor and associated memory that stores the steps of a computer program to perform the functions of the modules of the reimbursement system 100. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming. For example, the actual source code or object code of the computer program can be stored in the memory.

FIGS. 2A-2E are flowcharts illustrating steps for conducting a financial transaction, in accordance with an exemplary embodiment of the present invention. In step 202 of FIG. 2A, a purchase account is issued with an absence of association to a reimbursement account. In step 204, the purchase account is registered. An association with the reimbursement account is formed for reimbursement transactions. According to an exemplary embodiment, the registered purchase account can comprise, for example, a registered card or the like. For example, the registered card can comprise a credit card, a credit account, a debit card, a debit account, a customer loyalty card, a customer loyalty account, or a vendor billing account. However, the registered card can comprise any suitable type of a bar code, a magnetic stripe, a computer chip or the like. The reimbursement account can comprise an employee benefit account, such as, for example, at least one of a healthcare spending account, a dependent care account, a flexible spending account, a transit account or the like. Alternatively or additionally, the reimbursement account can comprise at least one of a corporate expense account, a client expense account, an employer's expense account or the like.

In step 206, the reimbursement account, at least one settlement account and at least one registered purchase account for a user is registered. In step 208, at least one registered purchase account is registered for a third party associated with the user. The steps of registering can be performed either electronically or manually. In step 210, an agreement with the user is re-affirmed, each time the registered purchase account is used, that reimbursable purchases made in connection with the registered purchase account will only be used for authorized purposes. If the registered purchase account comprises a registered card, then in step 212, the credit card, the debit card, the customer loyalty card or the vendor billing account can be identified as the registered purchase account. For example, in step 214, a decal can be affixed to the registered card that enables compliance with regulations relating to purchases that initiate disbursements from the reimbursement account.

Figure 2A:
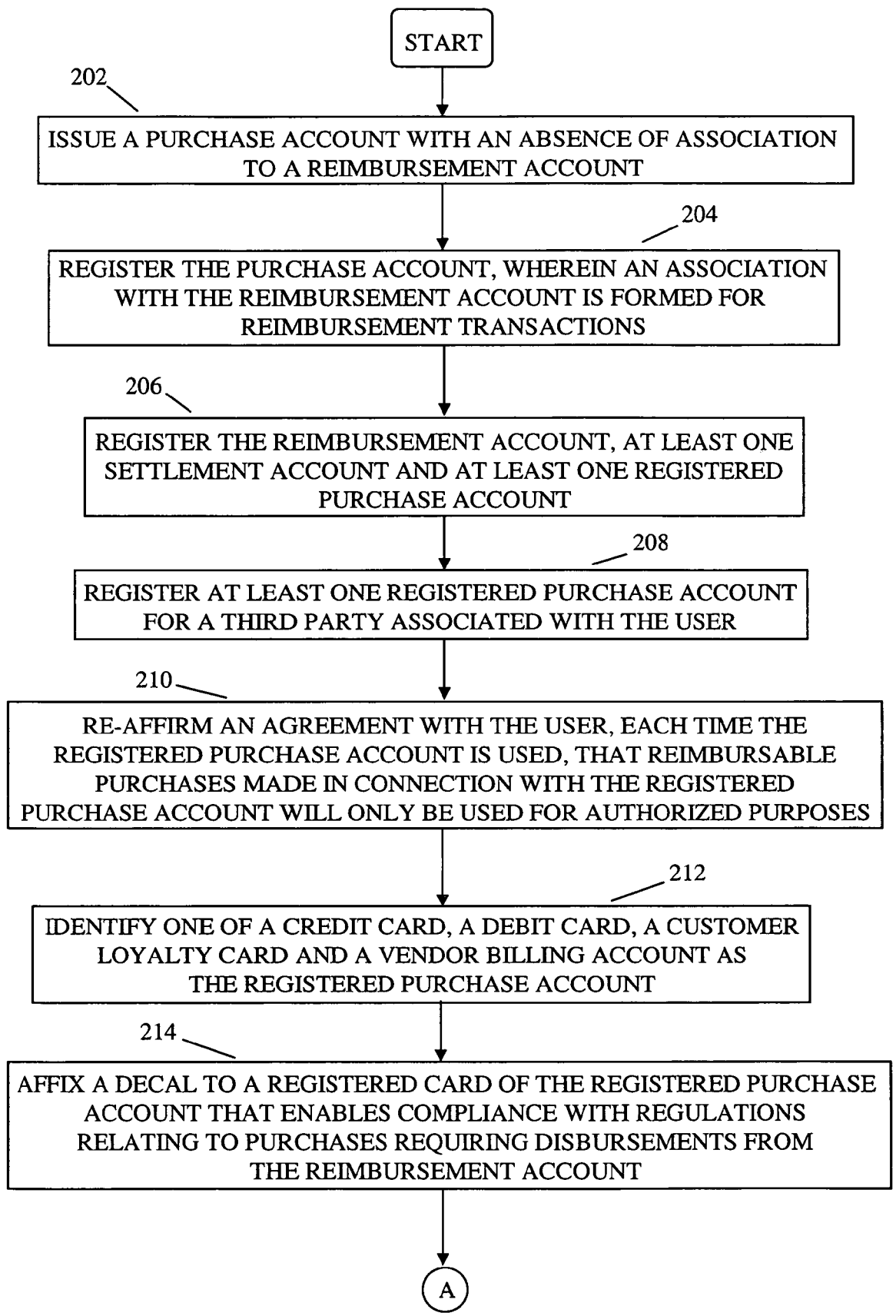
Figure 2B:
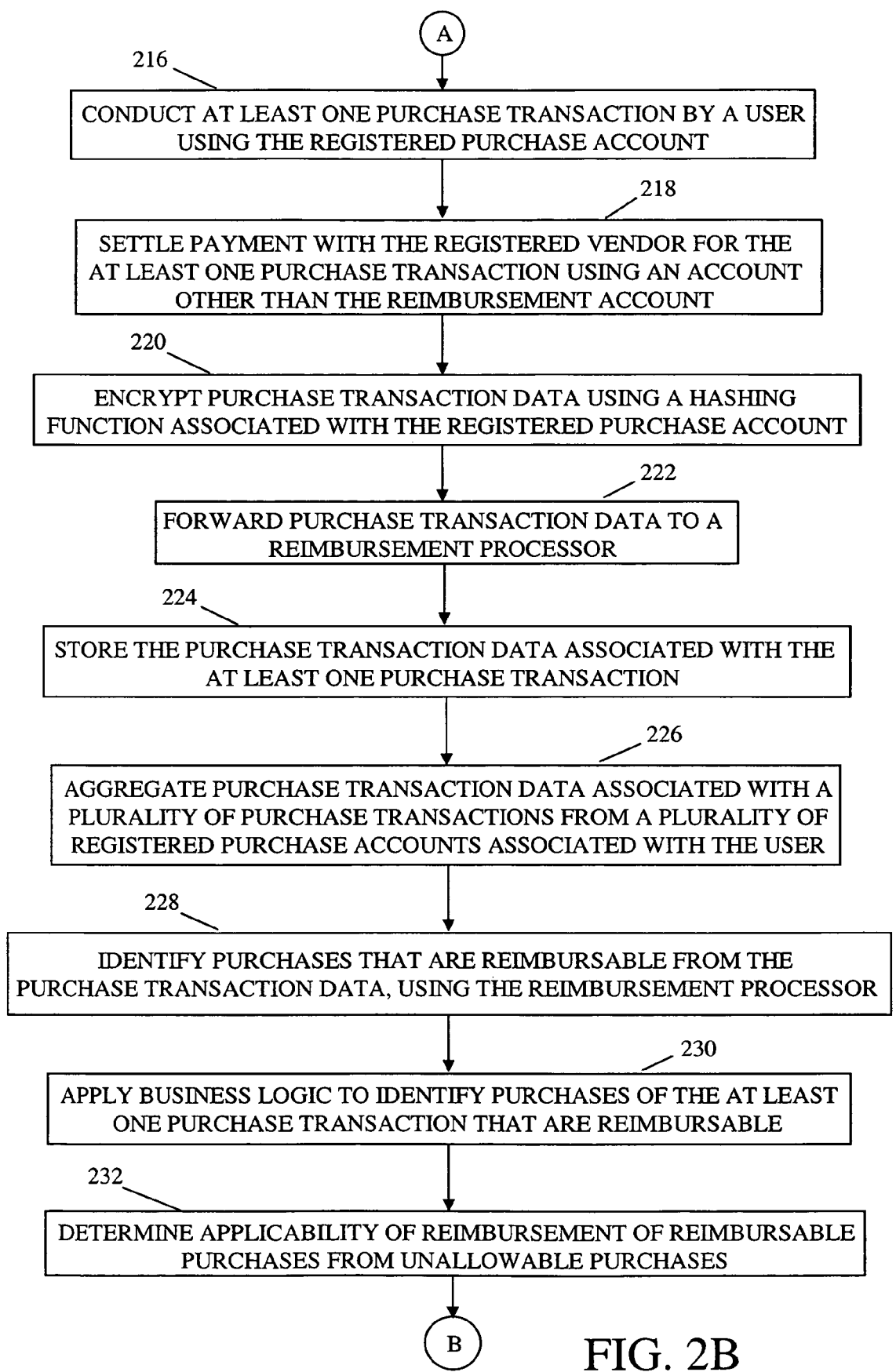

In step 216 of FIG. 2B, at least one purchase transaction can be conducted by a user using the registered purchase account. The at least one purchase transaction can comprise reimbursable and/or unallowable purchases. The at least one purchase transaction can create an obligation upon the user of the registered purchase account to pay for the at least one purchase transaction with funds associated with the user. Purchase transaction data associated with the at least one purchase transaction can be collected. The purchase transaction data associated with the at least one purchase transaction can comprise, for example, at least one of a SKU, a UPC, a CPT, a quantity of items or services purchased, prices of the items or services purchased, taxes, delivery charges, and freight charges. Furthermore, the step of conducting can be performed by the user at a registered vendor. In step 218, payment can be settled with the registered vendor for the at least one purchase transaction using an account other than the reimbursement account. In step 220, the purchase transaction data can be encrypted using, for example, a hashing function or other suitable encryption technique associated with the registered purchase account. In other words, the purchase transaction data can be forwarded in a secure format. In addition, information associated with the registered purchase account can also be encrypted.

In step 222, the purchase transaction data is forwarded to a reimbursement processor. The step of forwarding can be performed substantially concurrently when the at least one purchase transaction is conducted, although the step of forwarding can be performed at any time after the at least one purchase transaction is conducted. In step 224, the purchase transaction data associated with the at least one purchase transaction can be stored. In step 226, purchase transaction data associated with a plurality of purchase transactions can be aggregated from a plurality of registered purchase accounts associated with the user. In step 228, purchases that are reimbursable are identified from the purchase transaction data, using the reimbursement processor. In step 230, business logic can be applied to identify purchases of the at least one purchase transaction that are reimbursable. In step 232, the applicability of reimbursement of reimbursable purchases from unallowable purchases can be determined, using the step of applying business logic. According to an exemplary embodiment, each of a plurality of reimbursement accounts is associated with one of a plurality of rule sets. The step of applying business logic can be applied to each of the plurality of rule sets for each of the plurality of reimbursement accounts.

Figure 2C:
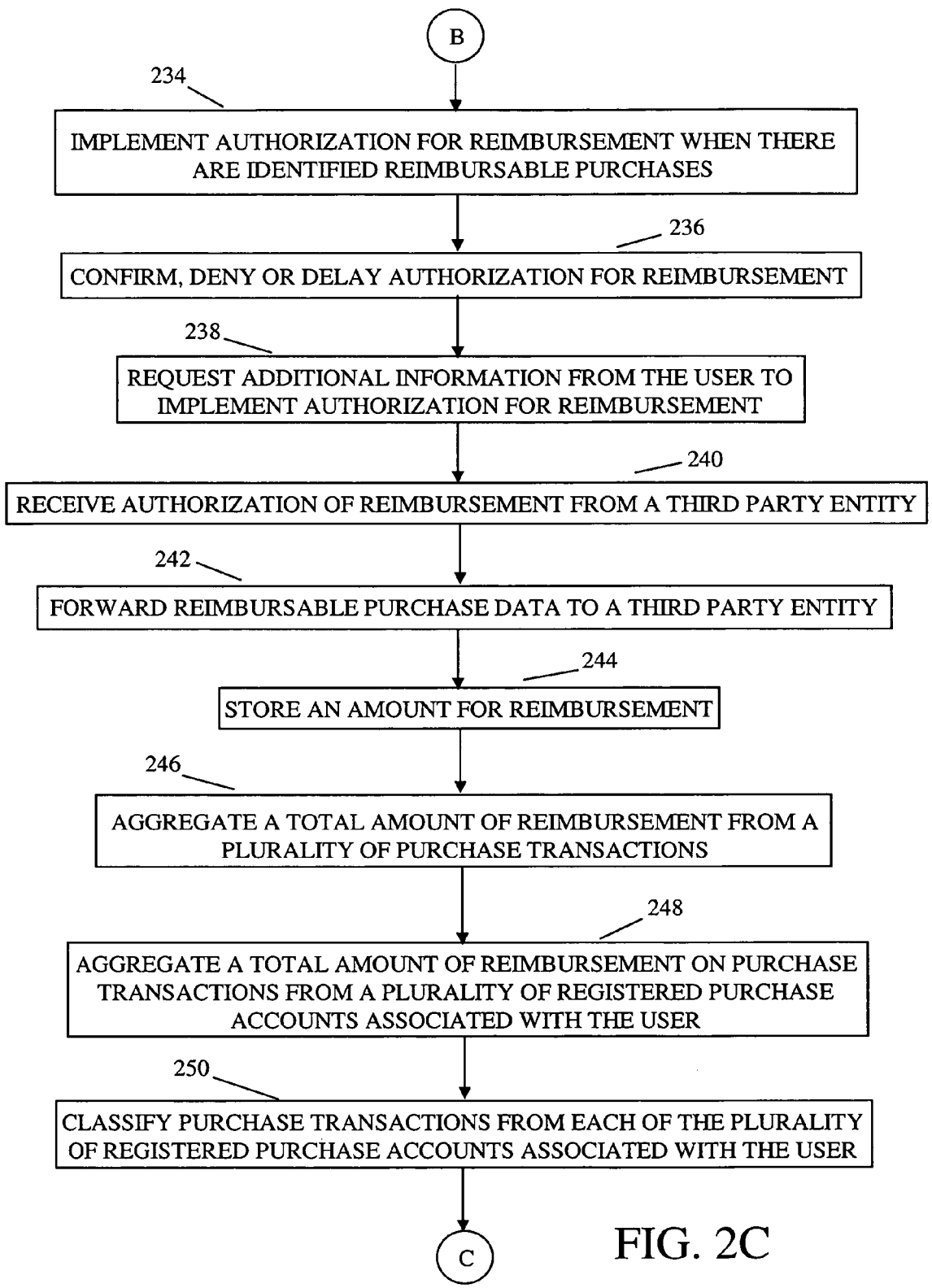

In step 234 of FIG. 2C, authorization for reimbursement is implemented when there are identified reimbursable purchases. The identified reimbursable purchases can be associated with the reimbursement account based upon the association created between the registered purchase account and the reimbursement account. In step 236, authorization of reimbursement can be confirmed, denied or delayed. In step 238, additional information can be requested from the user to implement authorization for reimbursement. In step 240, authorization of reimbursement can be received from a third-party entity. In step 242, reimbursable purchase data can be forwarded to a third-party entity. In step 244, an amount for reimbursement can be stored. In step 246, a total amount of reimbursement can be aggregated from a plurality of purchase transactions. In step 248, a total amount of reimbursement on purchase transactions can be aggregated from a plurality of registered purchase accounts associated with the user. In step 250, purchase transactions from each of the plurality of registered purchase accounts associated with the user can be classified. For example, each classification can comprise either a user transaction classification or a tentative user transaction classification.

In step 252 of FIG. 2D, a reimbursed amount and purchase transaction data associated with the reimbursed amount can be recorded. In step 254, authorization for reimbursement to at least one settlement account can be facilitated for the identified reimbursable purchases. In step 256, a settlement transaction for the reimbursement can be recorded. The settlement transaction can comprise complete reimbursements, pending reimbursements and/or partial reimbursements. The reimbursement can be performed in many ways. For example, a reimbursement can be performed through a funds transfer from the reimbursement account to the user. Alternatively, a reimbursement can be performed through a funds transfer from the reimbursement account into at least one settlement account. A reimbursement can also be performed through a net settlement process. Additionally, a reimbursement can be performed by decrementing a value of the reimbursement account and incrementing a value of a settlement account. The funds transfer can comprise an automated clearing house transfer. For example, the funds transfer can comprises a transfer of funds between accounts in different financial institutions, or a transfer of funds between accounts within a financial institution.

From step 256, one of steps 258 to 270 can alternatively be performed. For example, in step 258, reimbursement funds from a plurality of reimbursement accounts can be collected into at least one settlement account. Alternatively, in step 260, funds from the plurality of reimbursement accounts can be deposited into at least one registered purchase account. However, in step 262, a check, draft or a transfer of funds from the reimbursement account into a payroll account can be issued. For example, in step 264, a reimbursement transaction can be reversed by withdrawing funds from the at least one settlement account, when a disbursement overpayment occurs. Alternatively, in step 266, a payment transaction can be reversed for an unallowable purchase. However, in step 268, a disbursement can be reversed when the disbursement was made for unallowable purchases. For example, in step 270, a reimbursement report can be issued to a payroll processor.

Figure 2E:
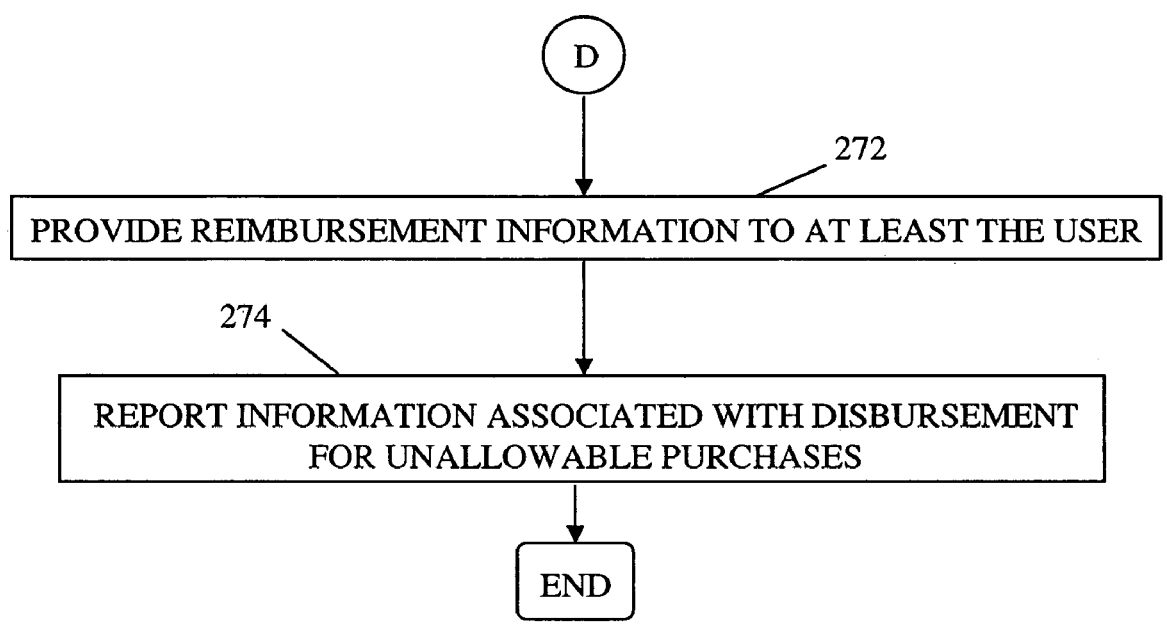

In step 272 of FIG. 2E, reimbursement information can be provided to at least the user. According to an exemplary embodiment, the reimbursement information can include at least one of allowed purchases, unallowed purchases, reimbursements, reimbursable amounts, requests, and other information associated with the user. In step 274, information associated with disbursement for unallowable purchases can be reported.

Figure 3:
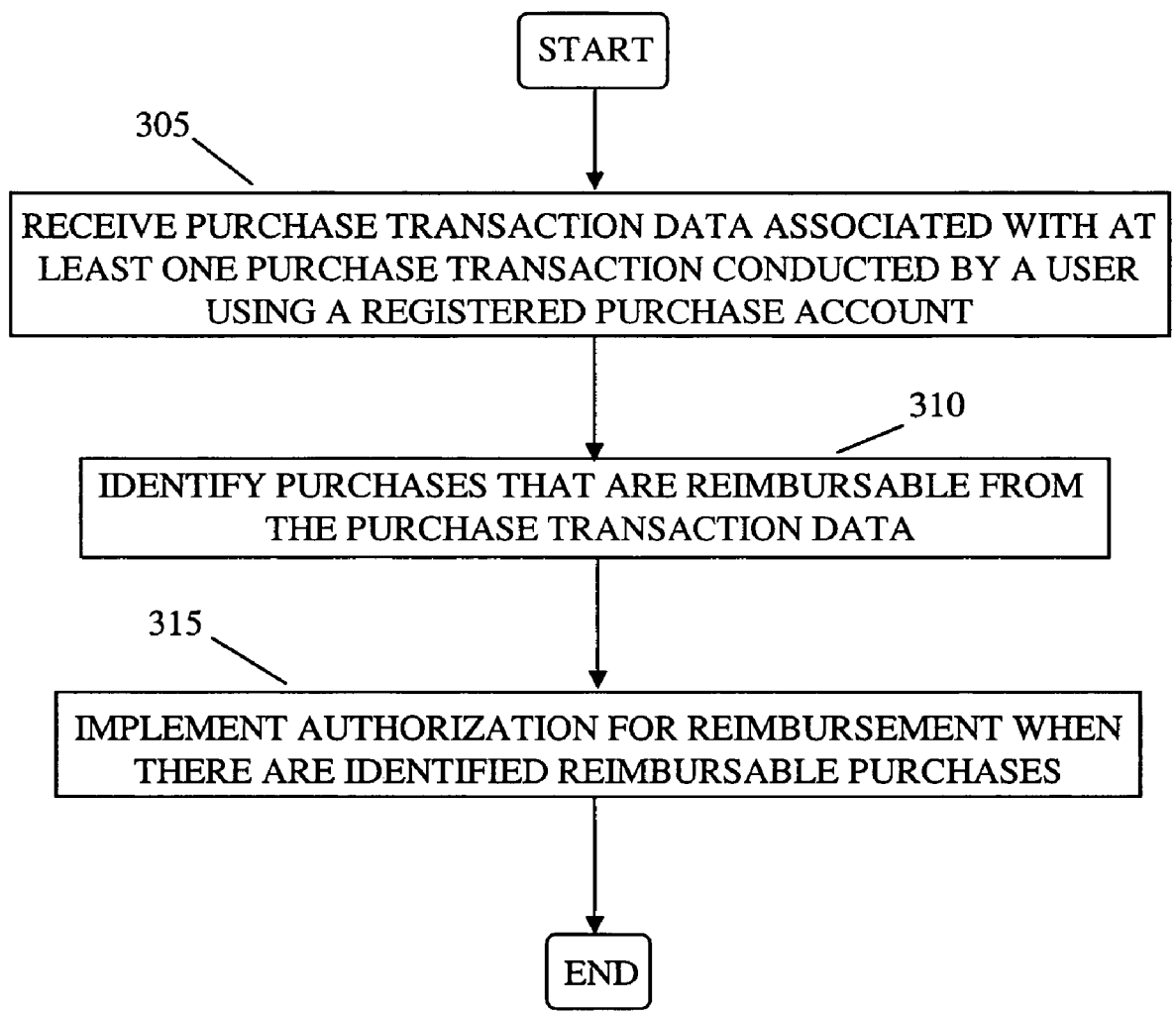
FIG. 3 is a flowchart illustrating steps for conducting a financial transaction, in accordance with an alternative exemplary embodiment of the present invention.

FIG. 3 is a flowchart illustrating steps for conducting a financial transaction, in accordance with an alternative exemplary embodiment of the present invention. In step 305, purchase transaction data can be received that is associated with at least one purchase transaction conducted by a user using a registered purchase account. The registered purchase account is issued with an absence of association to a reimbursement account. The at least one purchase transaction comprises at least one of reimbursable and unallowable purchases. The at least one purchase transaction creates an obligation upon the user of the registered purchase account to pay for the at least one purchase transaction with funds associated with the user from an account other than the reimbursement account. Purchase transaction data associated with the at least one purchase transaction is collected. Subsequent to the issuance of the registered purchase account, an association is created between the registered purchase account and the reimbursement account for reimbursement transactions. In step 310, purchases that are reimbursable are identified from the purchase transaction data. In step 315, authorization is implemented for reimbursement when there are identified reimbursable purchases. The identified reimbursable purchases are associated with the reimbursement account based upon the association between the registered purchase account and the reimbursement account.

Figure 4:
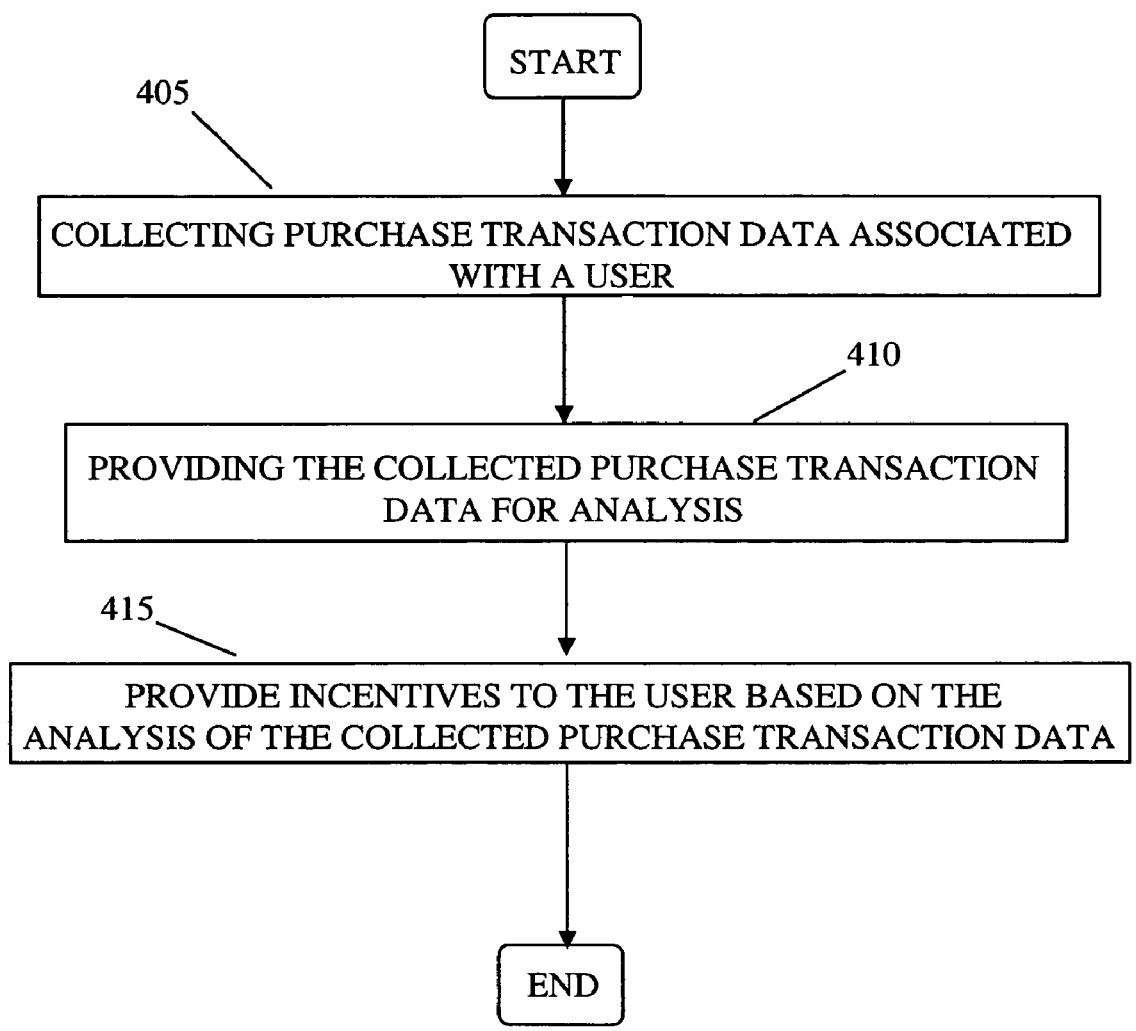
FIG. 4 is a flowchart illustrating steps for conducting a financial transaction, in accordance with an alternative exemplary embodiment of the present invention.

FIG. 4 is a flowchart illustrating steps for conducting a financial transaction, in accordance with an alternative exemplary embodiment of the present invention. In step 405, purchase transaction data associated with a user is collected. The purchase transaction data is associated with at least one purchase transaction conducted by the user using a registered purchase account. The registered purchase account is issued with an absence of association to a reimbursement account. For example, the registered purchase account can comprise a merchant or customer loyalty account or the like. Alternatively, the registered purchase account can comprise a credit card or the like. The at least one purchase transaction comprises at least one of reimbursable and unallowable purchases. The at least one purchase transaction creates an obligation upon the user of the registered purchase account to pay for the at least one purchase transaction with funds associated with the user from an account other than the reimbursement account. In step 410, the collected purchase transaction data is provided for analysis. Subsequent to the issuance of the registered purchase account, an association is created between the registered purchase account and the reimbursement account for reimbursement transactions. Purchases from the purchase transaction data are analyzed to determine reimbursable purchases and unallowable purchases. Authorization for reimbursement is initiated when there are reimbursable purchases. The reimbursable purchases are associated with the reimbursement account based upon the association between the registered purchase account and the reimbursement account.

In step 415, incentives can be provided to the user based on the analysis of the collected purchase transaction data. According to an exemplary embodiment, the collected purchase transaction data can be provided to a third-party entity. The third-party entity can forward the collected purchase transaction data to a reimbursement processor for analysis. For example, the third-party entity can comprise, for example, a bank.

Figure 5:
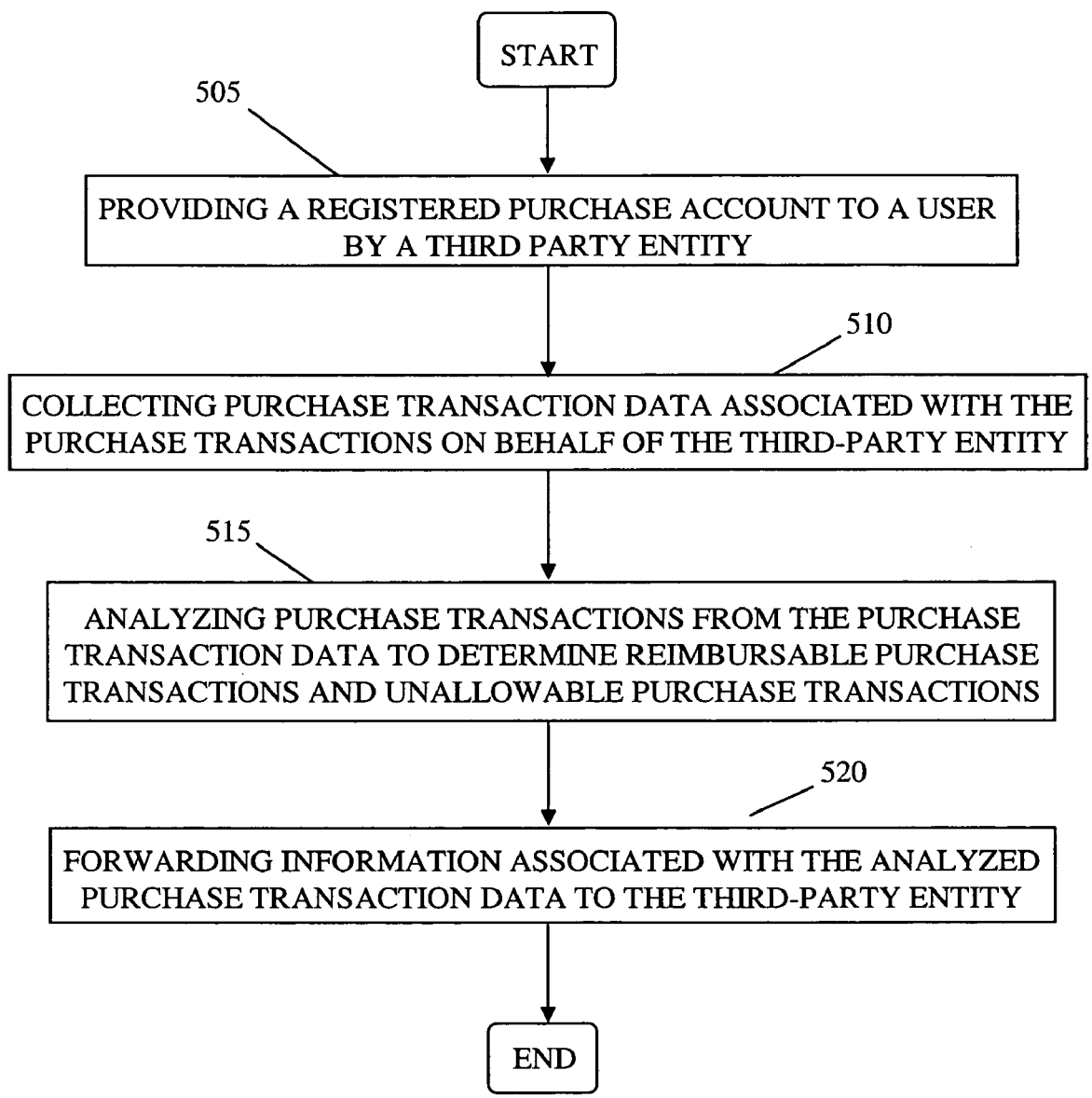
FIG. 5 is a flowchart illustrating steps for conducting a financial transaction, in accordance with an alternative exemplary embodiment of the present invention.

FIG. 5 is a flowchart illustrating steps for conducting a financial transaction, in accordance with an alternative exemplary embodiment of the present invention. In step 505, a registered purchase account can be provided to a user by a third-party entity. The registered purchase account is issued with an absence of association to a reimbursement account. The user uses the registered purchase account to conduct purchase transactions. The purchase transactions comprise at least one of reimbursable and unallowable purchases. The purchase transactions create an obligation upon the user of the registered purchase account to pay for the purchase transactions with funds associated with the user from an account other than the reimbursement account. In step 510, purchase transaction data associated with the purchase transactions can be collected on behalf of the third-party entity. In step 515, purchase transactions from the purchase transaction data can be analyzed to determine reimbursable purchases and unallowable purchases. Subsequent to the issuance of the registered purchase account, an association is created between the registered purchase account and the reimbursement account for reimbursement transactions. Authorization for reimbursement is initiated when purchase transactions include reimbursable purchases. The reimbursable purchases are associated with the reimbursement account based upon the association between the registered purchase account and the reimbursement account. In step 520, information associated with the analyzed purchase transaction data is forwarded to the third-party entity. According to the present alternative exemplary embodiment, the third-party entity can comprise, for example, an employer of the user.

According to another embodiment of the invention, a method is provided of processing a claim involving a restricted use flex account comprising: (a) storing an encrypted message corresponding to a consumer card number of a registered consumer payment card linked to a restricted use flex account, (b) obtaining data associated with one or more purchases, including one or more encrypted messages corresponding to one or more respective consumer card numbers associated with one or more consumer payment cards used to make the one or more purchases, (c) matching the one or more encrypted messages obtained with a stored encrypted message to identify a registered consumer payment card, (d) processing a claim requesting authorization to disburse funds from the restricted use flex account for the one or more purchases. In a particular embodiment of the invention, the method of processing a claim further comprises an encryption step, which step encrypts a consumer card number of a registered consumer payment card (or encrypts any other information that identifies a consumer) to provide an encrypted message corresponding to the consumer card number.

For the purposes of the invention, an encryption step may include any form of encryption, but generally includes an association of a consumer card number (or any other consumer identifying information) with another number comprising characters selected from numbers, letters of an alphabet, typographical characters, keyboard symbols, their corresponding ASCII characters, or combinations thereof. A preferred encryption step includes the use of irreversible encryption, such as the use of a hash function. A hash function provides a hash string corresponding to the consumer card number (or any other consumer identifying information). Thus, in a preferred embodiment of the invention, an encrypted message comprises a hash string.

Furthermore, the processing step includes application of certain guidelines governing the use of funds contained in the restricted use flex account and may include a determination of whether the one or more purchases is allowable under the certain guidelines. Eventually, the approval of a request for authorization may allow a reimbursement transaction of all or a portion of a purchase price (depending on the outcome of the application of the certain guidelines) to proceed. Yet another outcome might be authorization to allow a debit transaction to proceed (or to approve of a prior debit transaction). Still another outcome is that the request for authorization is denied or only partially approved, for example, contingent on the consumer producing a prescription or a note from a doctor or the like. In the event that a request is denied, the consumer is ultimately liable, in turn, for reimbursing the reimbursement account or restricted use flex account for the amount of the disbursement associated with the disallowed purchase. In any case, the method of processing a claim involving a restricted use flex account is not intended to include steps of a rebate/promotional account based system, which transmits funds (the rebate) back to a consumer or an account linked to the consumer.

Any combination or all of the steps of a computer program as illustrated in FIGS. 2-5 for conducting a financial transaction can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in conjunction with any device, system, process or transaction in which the reimbursement for allowable purchases made in connection with a single transaction containing both reimbursable and unallowable purchases is needed. For example, exemplary embodiments can be used by or in conjunction with financial institutions as part of various types of flexible spending accounts, by employers as part of expense accounts, by retail establishments as part of various types of purchase transactions, by health organizations that administer health spending accounts, and the like.

It will be appreciated by those of ordinary skill in the art that the present invention can be embodied in various specific forms without departing from the spirit or essential characteristics thereof. For example, exemplary embodiments of the present invention can be used to collect data for purchases made with restricted funds, where no reimbursement is made, but amounts for unallowable purchases must be collected from the user. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A method of conducting a financial transaction, comprising the steps of:
    issuing a purchase account with an absence of association to a reimbursement account;
    registering the purchase account,
        wherein an association with the reimbursement account is formed for reimbursement transactions;
    conducting at least one purchase transaction by a user using the registered purchase account,
        wherein the at least one purchase transaction comprises at least one of reimbursable and unallowable purchases,
        wherein the at least one purchase transaction creates an obligation upon the user of the registered purchase account to pay for the at least one purchase transaction with funds associated with the user from an account other than the reimbursement account, and
        wherein purchase transaction data associated with the at least one purchase transaction is collected;
    forwarding the purchase transaction data to a reimbursement processor;
    identifying purchases that are reimbursable from the purchase transaction data, using the reimbursement processor; and
    implementing authorization for reimbursement when there are identified reimbursable purchases,
        wherein the identified reimbursable purchases are associated with the reimbursement account based upon the association created between the registered purchase account and the reimbursement account.

2. The method of claim 1, further comprising:
    identifying the purchase transaction data.

3. The method according to claim 2, wherein the step of identifying the purchase transaction data comprises:
    receiving the forwarded purchase transaction data in the reimbursement processor in an encrypted format;
    comparing the received encrypted format transaction data to a set of known encrypted format transaction data; and
    determining or not the user based on the comparison between the received encrypted format transaction data and the set of known encrypted format data.

4. The method of claim 1, wherein the step of conducting is performed by the user at a registered vendor.

5. The method of claim 4, comprising the step of:
    settling payment with the registered vendor for the at least one purchase transaction.

6. The method of claim 1, wherein the step of implementing authorization comprises the step of:
    facilitating authorization for reimbursement to at least one settlement account for the identified reimbursable purchases.

7. The method of claim 1, comprising the step of:
    registering the reimbursement account, at least one settlement account and at least one registered purchase account for a user.

8. The method of claim 1, comprising the step of:
    re-affirming an agreement with the user, each time the registered purchase account is used, that reimbursable purchases made in connection with the registered purchase account will only be used for authorized purposes.

9. The method of claim 1, wherein the registered purchase account comprises a registered card.

10. The method of claim 9, comprising the step of:
    affixing a decal to the registered card that enables compliance with regulations relating to purchases that initiate disbursements from the reimbursement account.

11. The method of claim 1, wherein the purchase transaction data is forwarded in a secure format.

12. The method of claim 11, comprising the step of:
    encrypting the purchase transaction data using a hashing function associated with the registered purchase account.

13. The method of claim 1, comprising the step of:
    storing the purchase transaction data associated with the at least one purchase transaction.

14. The method of claim 1, comprising the step of:
    aggregating purchase transaction data associated with a plurality of purchase transactions from a plurality of registered purchase accounts associated with the user.

15. The method of claim 1, wherein the step of identifying comprises the step of:
    applying business logic to identify purchases of the at least one purchase transaction that are reimbursable.

16. The method of claim 15, wherein the step of applying business logic comprises the step of:
    determining applicability of reimbursement of reimbursable purchases from unallowable purchases.

17. The method of claim 1, wherein the step of implementing authorization comprises the step of:
    one of confirming, denying and delaying authorization of reimbursement.

18. The method of claim 17, comprising the step of:
    requesting additional information from the user to implement authorization for reimbursement.

19. The method of claim 17, comprising the step of:
    receiving authorization of reimbursement from a third-party entity.

20. The method of claim 1, comprising the step of:
    forwarding reimbursable purchase data to a third-party entity.

21. The method of claim 1, comprising the step of:
storing an amount for reimbursement.

22. The method of claim 1, comprising the step of:
aggregating a total amount of reimbursement from a plurality of purchase transactions.

23. The method of claim 1, comprising the step of:
aggregating a total amount of reimbursement on purchase transactions from a plurality of registered purchase accounts associated with the user.

24. The method of claim 23, comprising the step of:
classifying purchase transactions from each of the plurality of registered purchase accounts associated with the user.

25. The method of claim 1, comprising the step of:
recording a reimbursed amount and purchase transaction data associated with the reimbursed amount.

26. The method of claim 1, comprising the step of:
recording a settlement transaction for the reimbursement.

27. The method of claim 1, wherein the reimbursement account comprises at least one of a healthcare spending account, a dependent care account, a flexible spending account and a transit account.

28. The method of claim 1, wherein the reimbursement account comprises at least one of a corporate expense account, a client expense account, and an employer's expense account.

29. The method of claim 1, comprising the step of:
collecting reimbursement funds from a plurality of reimbursement accounts into at least one settlement account.

30. The method of claim 29, comprising the step of:
depositing funds from the plurality of reimbursement accounts into at least one registered purchase account.

31. The method of claim 1, comprising the step of:
issuing one of a check, draft and a transfer of funds from the reimbursement account into a payroll account.

32. The method of claim 1, comprising the step of:
providing reimbursement information to at least the user.

33. The method of claim 1, comprising the step of:
reversing a payment transaction for an unallowable purchase.

34. The method of claim 1, comprising the step of:
reversing a disbursement when the disbursement was made for unallowable purchases.

35. The method of claim 34, comprising the step of:
reporting information associated with disbursement for unallowable purchases.

36. The method of claim 1, wherein the registered purchase account comprises one of a credit card, a credit account, a debit card, a debit account, a customer loyalty card, a customer loyalty account and a vendor billing account.

37. The method of claim 36, comprising the step of:
identifying the one of the credit card, the credit account, the debit card, the debit account, the customer loyalty card, the customer loyalty account and the vendor billing account as the registered purchase account.

38. A method of conducting a financial transaction, comprising the steps of:
receiving purchase transaction data associated with at least one purchase transaction conducted by a user using a registered purchase account,
  wherein the registered purchase account is issued with an absence of association to a reimbursement account,
  wherein the at least one purchase transaction comprises at least one of reimbursable and unallowable purchases,
  wherein the at least one purchase transaction creates an obligation upon the user of the registered purchase account to pay for the at least one purchase transaction with funds associated with the user from an account other than the reimbursement account,
  wherein purchase transaction data associated with the at least one purchase transaction is collected, and
  wherein, subsequent to the issuance of the registered purchase account, an association is created between the registered purchase account and the reimbursement account for reimbursement transactions;
identifying purchases that are reimbursable from the purchase transaction data; and
implementing authorization for reimbursement when there are identified reimbursable purchases,
  wherein the identified reimbursable purchases are associated with the reimbursement account based upon the association between the registered purchase account and the reimbursement account.

39. A method of conducting a financial transaction, comprising the steps of:
collecting purchase transaction data associated with a user,
  wherein the purchase transaction data is associated with at least one purchase transaction conducted by the user using a registered purchase account,
  wherein the registered purchase account is issued with an absence of association to a reimbursement account,
  wherein the at least one purchase transaction comprises at least one of reimbursable and unallowable purchases, and
  wherein the at least one purchase transaction creates an obligation upon the user of the registered purchase account to pay for the at least one purchase transaction with funds associated with the user from an account other than the reimbursement account; and
providing the collected purchase transaction data for analysis,
  wherein, subsequent to the issuance of the registered purchase account, an association is created between the registered purchase account and the reimbursement account for reimbursement transactions,
  wherein purchases from the purchase transaction data are analyzed to determine reimbursable purchases and unallowable purchases,
  wherein authorization for reimbursement is initiated when there are reimbursable purchases, and
  wherein the reimbursable purchases are associated with the reimbursement account based upon the association between the registered purchase account and the reimbursement account.

40. The method of claim 39, comprising the step of:
providing incentives to the user based on the analysis of the collected purchase transaction data.

41. A method of conducting a financial transaction, comprising the steps of:
providing a registered purchase account to a user by a third-party entity,
  wherein the registered purchase account is issued with an absence of association to a reimbursement account,
  wherein the user uses the registered purchase account to conduct purchase transactions,
  wherein the purchase transactions comprise at least one of reimbursable and unallowable purchases, and
  wherein the purchase transactions create an obligation upon the user of the registered purchase account to pay for the purchase transactions with funds associated with the user from an account other than the reimbursement account;
collecting purchase transaction data associated with the purchase transactions on behalf of the third-party entity;

analyzing purchase transactions from the purchase transaction data to determine reimbursable purchases and unallowable purchases, wherein, subsequent to the issuance of the registered purchase account, an association is created between the registered purchase account and the reimbursement account for reimbursement transactions, wherein authorization for reimbursement is initiated when there are reimbursable purchases, and wherein the reimbursable purchases are associated with the reimbursement account based upon the association between the registered purchase account and the reimbursement account; and forwarding information associated with the analyzed purchase transaction data to the third-party entity.

42. A method of conducting a financial transaction, comprising the steps of:

obtaining a registered purchase account by a user, wherein the registered purchase account is issued with an absence of association to a reimbursement account;

conducting purchase transactions using the registered purchase account, wherein the purchase transactions comprise at least one of reimbursable and unallowable purchases, wherein the purchase transactions create an obligation upon the user of the registered purchase account to pay for the purchase transactions with funds associated with the user from an account other than the reimbursement account, wherein purchase transaction data associated with the purchase transactions conducted by the user is collected, wherein, subsequent to the issuance of the registered purchase account, an association is created between the registered purchase account and the reimbursement account for reimbursement transactions, wherein purchase transactions from the collected purchase transaction data are analyzed to determine reimbursable purchases and unallowable purchases, wherein authorization for reimbursement is initiated when there are reimbursable purchases, and wherein the reimbursable purchases are associated with the reimbursement account based upon the association between the registered purchase account and the reimbursement account.

43. A system for conducting a financial transaction, comprising:

a purchase transaction data collector, wherein a registered purchase account is issued with an absence of association to a reimbursement account, wherein at least one purchase transaction is conducted by a user using the registered purchase account, wherein the at least one purchase transaction comprises at least one of reimbursable and unallowable purchases, wherein the at least one purchase transaction creates an obligation upon the user of the registered purchase account to pay for the at least one purchase transaction with funds associated with the user from an account other than the reimbursement account, wherein the purchase transaction data collector is configured to collect purchase transaction data associated with the at least one purchase transaction, and wherein, subsequent to the issuance of the registered purchase account, an association is created between the registered purchase account and the reimbursement account for reimbursement transactions; and a reimbursement processor in communication with the purchase transaction data collector, wherein the reimbursement processor is configured to receive the purchase transaction data from the purchase transaction data collector, wherein the reimbursement processor is configured to identify purchases that are reimbursable from the purchase transaction data, wherein the reimbursement processor is configured to implement authorization for reimbursement when there are identified reimbursable purchases, and wherein the identified reimbursable purchases are associated with the reimbursement account based upon the association between the registered purchase account and the reimbursement account.

44. A system for conducting a financial transaction, comprising:

means collecting purchase transaction data associated with a user, wherein the purchase transaction data is associated with at least one purchase transaction conducted by the user using a registered purchase account, wherein the registered purchase account is issued with an absence of association to a reimbursement account, wherein the at least one purchase transaction comprises at least one of reimbursable and unallowable purchases, wherein the at least one purchase transaction creates an obligation upon the user of the registered purchase account to pay for the at least one purchase transaction with funds associated with the user from an account other than the reimbursement account, wherein, subsequent to the issuance of the registered purchase account, an association is created between the registered purchase account and the reimbursement account for reimbursement transactions; and means for analyzing the collected purchase transaction data, wherein the purchase transaction data analyzing means is configured to analyze purchases from the purchase transaction data to determine reimbursable purchases and unallowable purchases, wherein authorization for reimbursement is initiated when there are reimbursable purchases, and wherein the reimbursable purchases are associated with the reimbursement account based upon the association between the registered purchase account and the reimbursement account.

* * * * *